United States Patent
Uemura

(10) Patent No.: US 11,435,966 B2
(45) Date of Patent: Sep. 6, 2022

(54) IMAGE FORMING SYSTEM INCLUDING IMAGE FORMING APPARATUS AND WIRELESS OPERATION UNIT WHICH OPERATES THE IMAGE FORMING APPARATUS VIA WIRELESS COMMUNICATION

(71) Applicant: CANON KABUSHIKI KAISHA, Tokyo (JP)

(72) Inventor: Takuya Uemura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/489,586

(22) Filed: Sep. 29, 2021

(65) Prior Publication Data

US 2022/0100449 A1   Mar. 31, 2022

(30) Foreign Application Priority Data

Sep. 30, 2020   (JP) .............................. JP2020-166313

(51) Int. Cl.
   *G06F 3/12*   (2006.01)
(52) U.S. Cl.
   CPC .......... *G06F 3/1253* (2013.01); *G06F 3/1204* (2013.01); *G06F 3/1221* (2013.01); *G06F 3/1236* (2013.01); *G06F 3/1284* (2013.01)
(58) Field of Classification Search
   CPC .... G06F 3/1253; G06F 3/1204; G06F 3/1221; G06F 3/1236; G06F 3/1284
   USPC ........................................................ 358/1.15
   See application file for complete search history.

(56) References Cited

U.S. PATENT DOCUMENTS

| | | | | |
|---|---|---|---|---|
| 8,593,663 | B2 * | 11/2013 | Yoshida ............. | H04N 1/32112 358/1.14 |
| 2010/0177345 | A1 * | 7/2010 | Watanabe ............... | G06F 3/126 358/1.15 |
| 2012/0300257 | A1 * | 11/2012 | Nakajima .......... | H04N 1/00501 358/1.15 |
| 2019/0235594 | A1 | 8/2019 | Senba | |
| 2019/0379796 | A1 | 12/2019 | Sugita | |

FOREIGN PATENT DOCUMENTS

| | | |
|---|---|---|
| JP | 2015080857 A | 4/2015 |
| JP | 2019213135 A | 12/2019 |

* cited by examiner

*Primary Examiner* — Allen H Nguyen
(74) *Attorney, Agent, or Firm* — Canon U.S.A., Inc. IP Division

(57) ABSTRACT

In a case where an image forming apparatus has entered into a sleep mode, a user is required to wait, after issuing an instruction for image formation via a wireless operation unit, until the image forming apparatus returns from the sleep mode to a standby mode, for the requested processing to be performed. Accordingly, an image forming system is provided that includes an image forming apparatus capable of transitioning between a standby mode and a sleep mode includes a wireless operation unit capable of performing wireless communication with the image forming apparatus, and that includes a counter for counting a time for determining timing of transition from the standby mode to the sleep mode, and a resetter capable of resetting a count value of the counter in response to a predetermined icon being selected in the wireless operation unit in the standby mode.

10 Claims, 20 Drawing Sheets

IMAGE FORMING SYSTEM INCLUDING IMAGE FORMING APPARATUS AND WIRELESS OPERATION UNIT WHICH OPERATES THE IMAGE FORMING APPARATUS VIA WIRELESS COMMUNICATION

BACKGROUND

Field

Aspects of the present disclosure generally relate to an image forming system including an image forming apparatus, such as an electrophotographic copying machine or an electrophotographic printer (for example, a laser beam printer or a light-emitting diode (LED) printer), and a post-processing apparatus.

Description of the Related Art

Usually, an image forming apparatus is capable of performing switchover processing between a standby mode, in which the image forming apparatus is ready to perform image formation, and a sleep mode, in which the image forming apparatus uses less power than in the standby mode. Such an image forming apparatus transitions to the sleep mode when, in the standby mode, a state in which, for example, a "copy start" button or a "print start" button is not pressed continues for a predetermined length of time.

Furthermore, an image forming apparatus is able to be configured to cooperate with a mobile terminal such as a smartphone. Causing the mobile terminal to cooperate with the image forming apparatus enables the mobile terminal, instead of an operation unit of the image forming apparatus, to perform an operation on the image forming apparatus. Japanese Patent Application Laid-Open No. 2019-213135 discusses a configuration in which installing a dedicated application on a mobile terminal enables using the mobile terminal to provide instructions for an operation which is to be performed in an image forming apparatus. Specifically, the user is able to perform a setting operation for electronic mail (e-mail) on the mobile terminal. Then, pressing (in the mobile terminal) an icon for transmission in a setting screen for e-mail causes a screen for such e-mail to be displayed on a display of an operation unit provided at the image forming apparatus. When the image forming apparatus in the sleep mode has received e-mail transmitted from the mobile terminal in such a manner, the image forming apparatus transitions from the sleep mode to the standby mode (performs a return operation).

However, the configuration discussed in Japanese Patent Application Laid-Open No. 2019-213135 is a configuration in which the image forming apparatus performs a return operation as a result of receiving data from the mobile terminal. Thus, a "transmission" icon being pressed at the mobile terminal, in a state in which the dedicated application has been started up in the mobile terminal is a trigger for the image forming apparatus to perform the return operation. However, even if a setting operation for e-mail (editing of the address or editing of the body text) is performed, the image forming apparatus does not perform a return operation if the setting operations is performed on the mobile terminal instead of an operation unit of the image forming apparatus.

Accordingly, while the user is spending time on, for example, a setting operation on the mobile terminal, the image forming apparatus may transition from the standby mode to the sleep mode. In such circumstances, the image forming apparatus needs to perform a return operation after the user issues an instruction to the mobile terminal for transmission and, therefore, the completion of the requested processing may be more time-consuming. Particularly, in a case where the user performs setting of a copy operation at the mobile terminal, if an operation for the setting is time-consuming, a length of time required for the image forming apparatus to start copying is likely to become longer.

While causing the image forming apparatus to automatically transition from the standby mode to the sleep mode enables a reduction in power consumption, since the transition from sleep mode to the standby mode is time-consuming, in some circumstances, the automatic transition from the standby mode to the sleep mode can result in a reduction in productivity.

SUMMARY

According to one embodiment of the present disclosure, an image forming system includes an image forming apparatus and a wireless operation device as described further below. The image forming apparatus includes an image forming unit for forming an image on a sheet and is configured to receive an execution command for causing the image forming unit to perform image formation. The image forming apparatus is also configured to be able to transition between a standby mode, which is an electric power state that enables performing image formation in response to the execution command being received, and a sleep mode, in which reception of the execution command is not performed and which is an electric power state in which less power is consumed than that in the standby mode. The wireless operation device includes a setting icon corresponding to a setting key for setting an image forming condition for image formation to be performed and an execution icon corresponding to an execution key for causing image formation that is based on an image forming condition to be set by using the setting key, to be performed. The wireless operation device is also configured to wirelessly transmit an operation command to the image forming apparatus in response to the setting icon being operated and to wirelessly transmit an execution command to the image forming apparatus in response to the execution icon being operated. The wireless operation device also includes a counter configured to count a time for determining a timing at which the image forming apparatus transitions from the standby mode to the sleep mode, and a resetter configured to reset a count value provided by the counter regardless of whether any one of the execution icon or the setting icon is operated.

According to another embodiment of the present disclosure, a wireless operation unit is provided for operating, via wireless communication, an image forming apparatus including an image forming unit for forming an image on a sheet. The image forming apparatus is configured to receive an execution command for causing the image forming unit to perform image formation, and the image forming apparatus is configured to be able to transition between a standby mode, which is an electric power state that enables performing image formation in response to the execution command being received, and a sleep mode, in which reception of the execution command is not performed and which is an electric power state in which less power is consumed than in the standby mode. The wireless operation unit includes an operation unit including a setting icon corresponding to a setting key for setting an image forming condition for image formation to be performed and an execution icon corresponding to an execution key for causing image formation that is based on an image forming condition to be set by using the setting key, to be performed. The wireless operation device is configured to wirelessly transmit an operation command to the image forming apparatus in response to the setting icon being operated, and an execution command is wirelessly transmitted to the image forming apparatus in response to the execution icon being operated. The wireless operation device further includes a counter configured to be able to reset a count value for a time for determining timing at which the image forming apparatus transitions from the standby mode to the sleep mode, and a resetter configured to reset the count value of the counter regardless of whether any one of the execution icon or the setting icon is operated.

Further features of the present disclosure will become apparent from the following description of example embodiments with reference to the attached drawings.

DESCRIPTION OF THE EMBODIMENTS

<Image Forming Apparatus>

The overall configuration of an image forming apparatus along with an operation thereof for image formation according to example embodiments of the present disclosure are described below with reference to the drawings. Furthermore, it is noted that the dimensions, materials, shapes, and relative arrangements of components described below are, unless otherwise specifically stated, not to be construed to limit the scope of the present invention to only the described embodiments.

Figure 1:
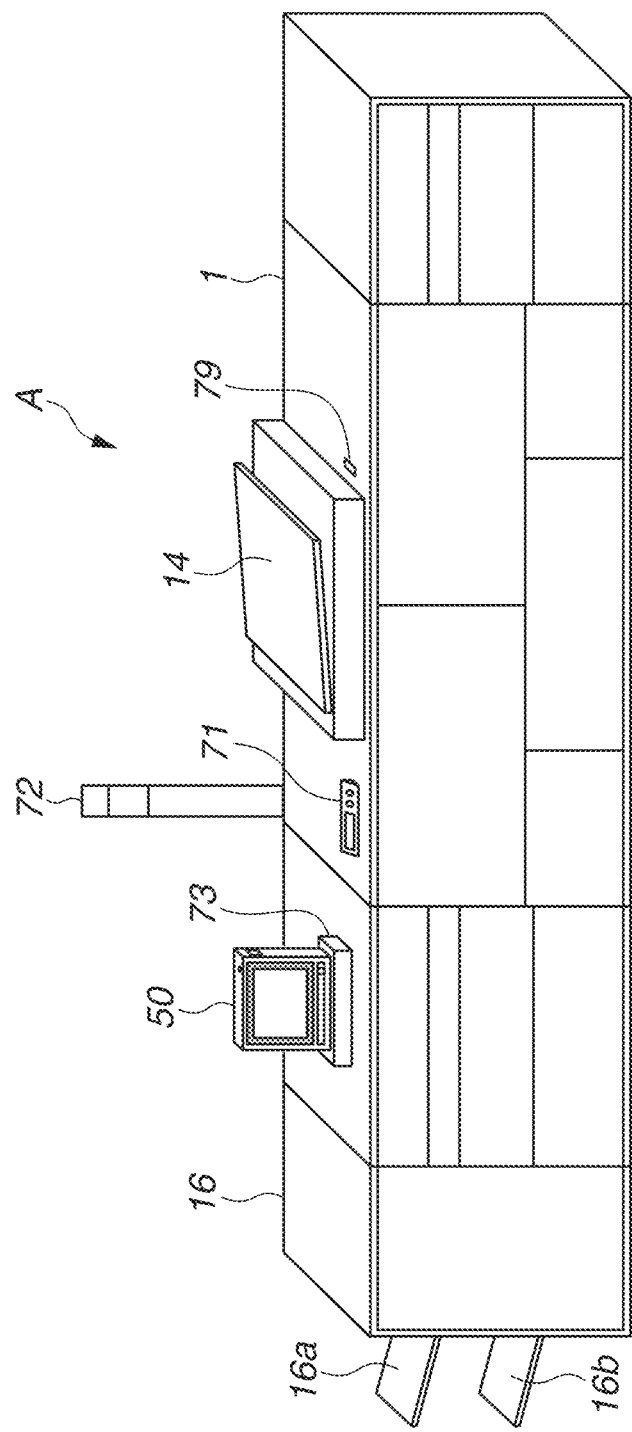
FIG. 1 is a perspective schematic view of an image forming system according to one embodiment.

FIG. 1 is a perspective schematic view of an image forming system A including an image forming apparatus 1. As illustrated in FIG. 1, the image forming system A includes the image forming apparatus 1, which forms an image on a sheet S (FIG. 3), and a post-processing apparatus 16, which performs post-processing, such as stapling, punching, or bookbinding, on a sheet S with an image formed thereon by the image forming apparatus 1. Moreover, at an upper portion of the image forming apparatus 1, a reader 14, which optically reads an image of an original placed on a glass surface (not illustrated) and converts the read image into image data.

The image forming apparatus 1 includes a main power switch 79 of the see-saw type, which switches between turning-on and turning-off of the main power source. Moreover, the image forming apparatus 1 includes a display panel 71, which informs the user of the status of the image forming apparatus 1, such as image formation processing being in progress, image formation processing being at a stop, or a standby state, by turning on a lamp or displaying error code. Moreover, the image forming apparatus 1 includes a tower-type lamp 72, which informs a user who is situated away from the image forming apparatus 1 of the status of the image forming apparatus 1 by turning-on, turning-off, or blinking of a light source.

Moreover, the image forming apparatus 1 includes a wireless operation unit 50 (a remote operation unit or a remote operation device), which is configured to be attachable to and detachable from a panel attachment portion 73. The wireless operation unit 50 is configured to be able to perform wireless communication with the image forming apparatus 1, and enables the user to perform an operation on the image forming apparatus 1 at a place away from the image forming apparatus 1. When the wireless operation unit 50 is attached to the panel attachment portion 73, a charging connector 55 (FIG. 2B) of the wireless operation unit 50 is connected to a feeding connector 73a (FIG. 5) of the panel attachment portion 73. With this connection, the connection of the wireless operation unit 50 is detected by the image forming apparatus 1, and charging is performed from the image forming apparatus 1 to a battery 57 (FIG. 5) of the wireless operation unit 50.

Figure 2A:
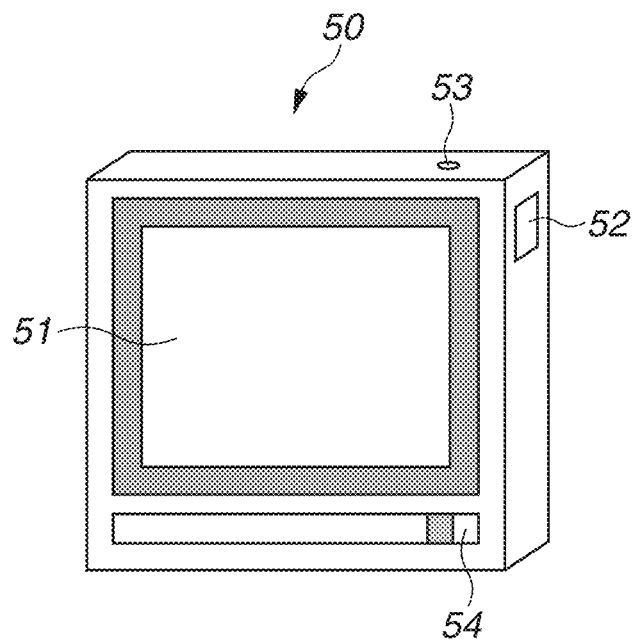
FIGS. 2A and 2B are perspective schematic views of a wireless operation unit according to one embodiment.
Figure 2B:
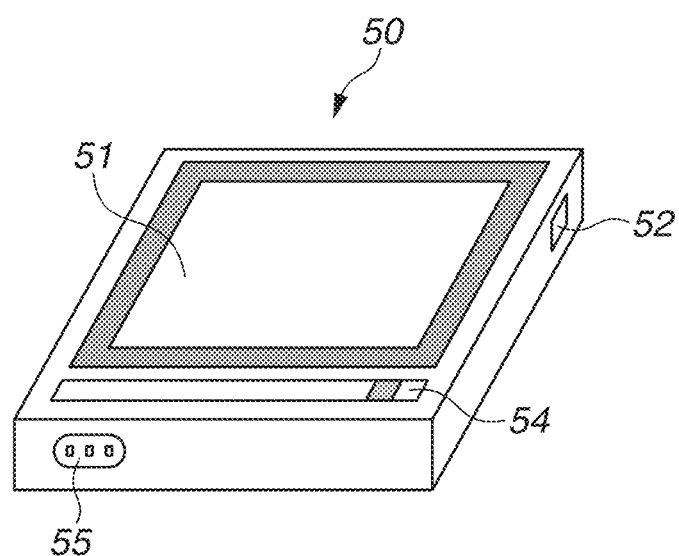

FIGS. 2A and 2B are perspective schematic views of the wireless operation unit 50. As illustrated in FIGS. 2A and 2B, the wireless operation unit 50 includes a power switch 52, which switches between turning-on and turning-off of the power source of the wireless operation unit 50, a loudspeaker unit 53, which outputs sound, and an illumination unit 54, which is configured with a light-emitting diode (LED) and which informs the user of the status of the wireless operation unit 50 by turning-on, turning-off, and blinking of the LED.

Moreover, the wireless operation unit 50 includes a display 51 of the touch panel type, which is configured with a display portion for displaying an image and an operation portion for allowing inputting of information being integrated with each other. The user is allowed to touch keys displayed in the display 51 to perform, for example, inputting of a numerical value, thus being able to perform setting related to image formation, such as the setting of the number of image-formed sheets or the size of the sheet S, or setting related to reading of an image, such as the setting of the size of an original. Furthermore, while, in the present example embodiment, a configuration in which the display 51 of the touch panel type is mounted on the wireless operation unit 50 has been described, the invention is not limited to this configuration, and, in other embodiments, a configuration in which hardware keys, such as a numeric keypad and a reset key, are separately provided as an operation portion for inputting information can be employed.

Figure 3:
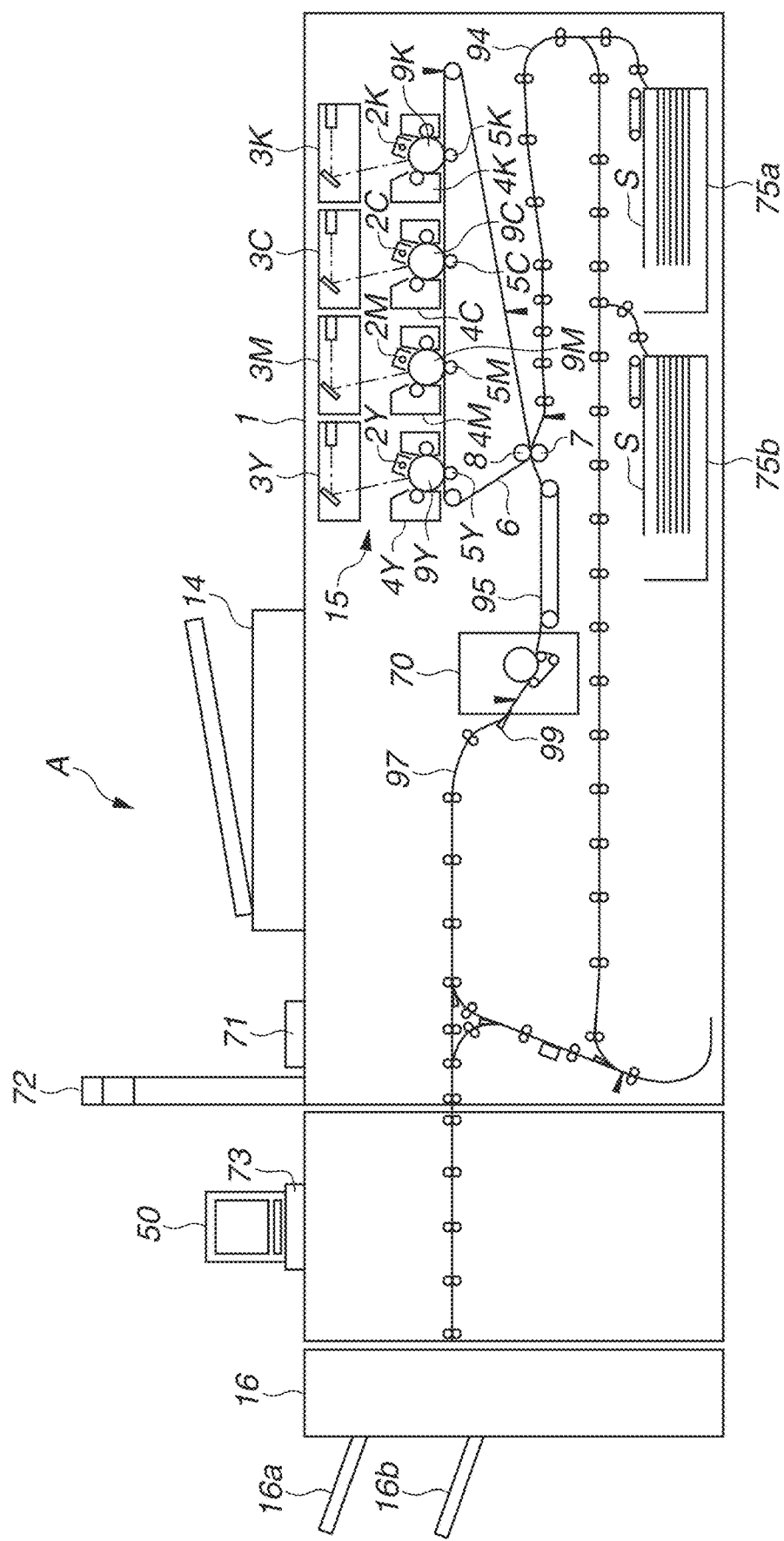
FIG. 3 is a sectional schematic view of the image forming system according to one embodiment.

FIG. 3 is a sectional schematic view of the image forming system A. As illustrated in FIG. 3, the image forming apparatus 1 includes an image forming unit 15, which forms an image on a sheet S. The image forming unit 15 includes photosensitive drums 9Y, 9M, 9C, and 9K, charging devices 2Y, 2C, 2M, ad 2K, and developing devices 4Y, 4M, 4C, and 4K. Moreover, the image forming unit 15 further includes, for example, primary transfer rollers 5Y, 5M, 5C, ad 5K, laser scanner units 3Y, 3M, 3C, and 3K, an intermediate transfer belt 6, a secondary transfer roller 7, and a secondary transfer counter roller 8.

Figure 4:
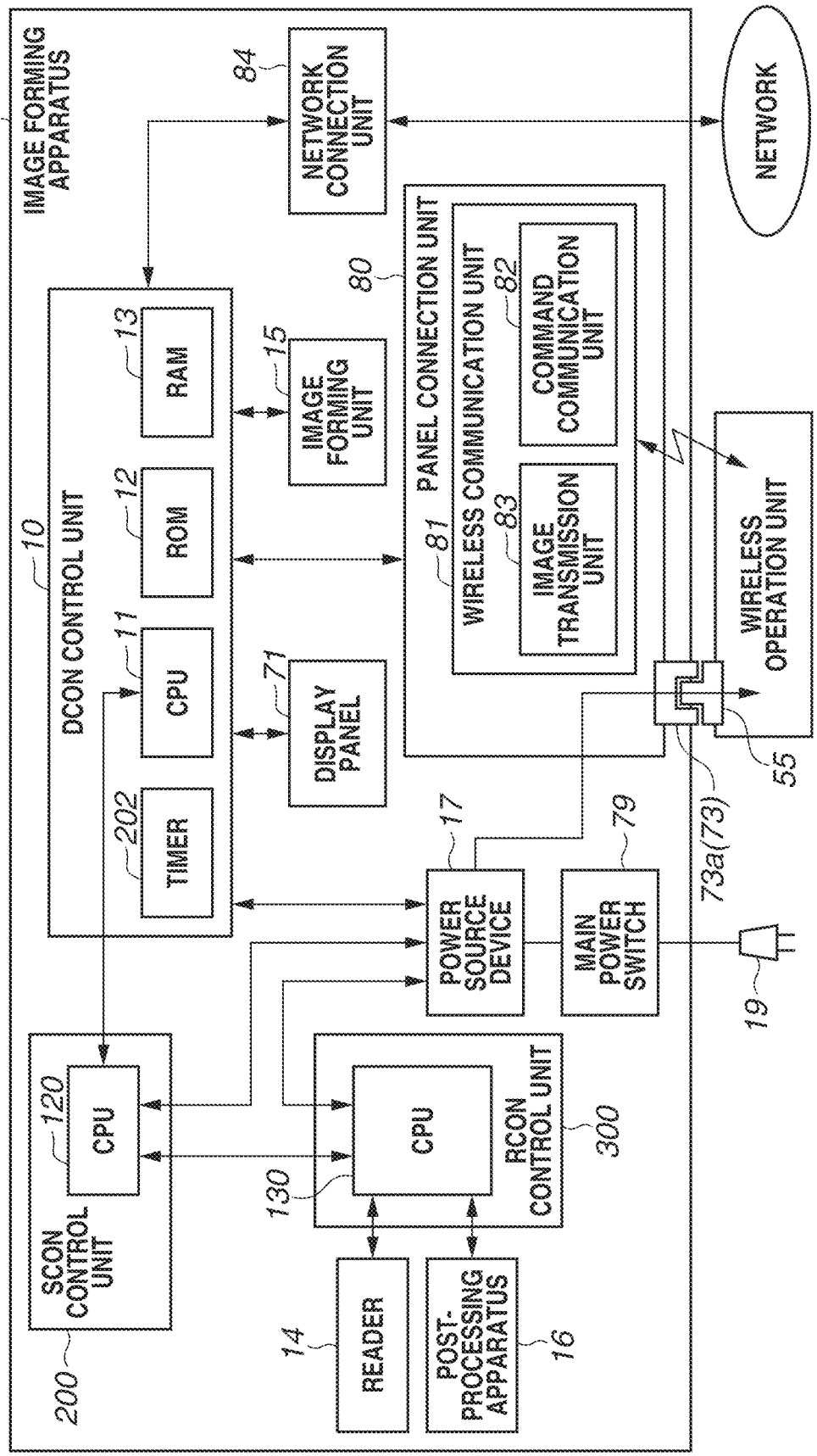
FIG. 4 is a block diagram illustrating a system configuration of an image forming apparatus according to one embodiment.

In forming an image with the image forming apparatus 1, first, an image forming job signal is input to a DCON control unit 10 illustrated in FIG. 4. With this inputting, a sheet S stored in any one of sheet cassettes 75a and 75b is fed to a conveyance path 94. Then, the sheet S passes through the conveyance path 94 and is fed to a secondary transfer portion formed by the secondary transfer roller 7 and the secondary transfer counter roller 8.

On the other hand, in the image forming unit 15, first, the surface of the photosensitive drum 9Y is charged with electricity by the charging device 2Y. Then, the laser scanner unit 3Y irradiates the surface of the photosensitive drum 9Y with laser light corresponding to image data about an original read by the reader 14 or image data transmitted from an external apparatus (not illustrated) via a network, thus forming an electrostatic latent image on the surface of the photosensitive drum 9Y.

Next, the developing device 4Y causes toner of yellow to adhere to the electrostatic latent image formed on the surface of the photosensitive drum 9Y, thus forming a toner image of yellow on the surface of the photosensitive drum 9Y. The toner image formed on the surface of the photosensitive drum 9Y is primarily transferred onto the intermediate transfer belt 6 by a primary transfer bias being applied to the primary transfer roller 5Y.

Similar processes are also performed to form toner images of magenta, cyan, and black on the photosensitive drums 9M, 9C, and 9K, respectively. Then, with primary transfer biases being applied to the primary transfer rollers 5M, 5C, and 5K, these toner images are transferred onto the toner image of yellow on the intermediate transfer belt 6 in a superimposed manner. With such transfer, a full-color toner image corresponding to an image signal is formed on the surface of the intermediate transfer belt 6.

Then, with the intermediate transfer belt 6 revolving, the formed full-color toner image is fed to a secondary transfer portion. Then, with a secondary transfer bias being applied to the secondary transfer roller 7 on the secondary transfer portion, the full-color toner image on the intermediate transfer belt 6 is transferred onto the sheet S. The sheet S with the toner image transferred thereto is conveyed to a fixing device 70 by a conveyance belt 95. Then, the sheet S is subjected to, for example, heating and pressure processing in the fixing device 70, so that the toner image is fixed to the sheet S.

Next, the sheet S with the toner image fixed thereto is conveyed to the post-processing apparatus 16 via a discharge path 97. In a case where the user designates post-processing, such as stapling, punching, or bookbinding, the sheet S conveyed to the post-processing apparatus 16 is subjected to the designated post-processing and is then discharged to a discharge tray 16a. Moreover, in a case where the user does not designate post-processing, the sheet S conveyed to the post-processing apparatus 16 is directly discharged to a discharge tray 16b without being subjected to any post-processing.

<System Configuration of Image Forming Apparatus>

Next, a system configuration of the image forming apparatus 1 is described.

FIG. 4 is a bock diagram illustrating a system configuration of the image forming apparatus 1. As illustrated in FIG. 4, a control unit group which controls the image forming apparatus 1 in response to power source voltages being supplied from a power source device 17 includes a DCON control unit 10, an SCON control unit 200, and an RCON control unit 300.

Here, the DCON control unit 10 performs control of various conveyance members, drive units such as motors for driving, for example, the image forming unit 15, and sensors such as a sheet detection sensor included in the image forming apparatus 1. Then, the SCON control unit 200 performs system control of the entire image forming apparatus 1, and thus performs control for, for example, communication control with an external apparatus via an interface (not illustrated) and image processing. More specifically, the SCON control unit 200 is able to perform, for example, reception of an image forming job, transmission of body information about the image forming apparatus 1, and image processing control over an image read by the reader 14 or image data received from, for example, an external apparatus. Moreover, the RCON control unit 300 performs various control operations for the reader 14 and the post-processing apparatus 16.

Here, the state in which the main power switch 79 is in an ON-state is a state in which the image forming apparatus 1 has been started up and a state in which commercial electric power is being supplied to the power source device 17 via, for example, an electric outlet and power source voltages are being supplied from the power source device 17 to the DCON control unit 10, the SCON control unit 200, and the RCON control unit 300.

Furthermore, in a case where the image forming apparatus 1 is connected to, for example, a commercial power source via, for example, an electric outlet, the power source device 17 is supplying a power source voltage of +5 volts (V) as always-on electric power to the SCON control unit 200. Then, in response to the main power switch 79 being turned on, the power source device 17 becomes able to supply power source voltages of +12 V or +24 V as a non-continuous power source to the DCON control unit 10, the SCON control unit 200, and the RCON control unit 300. While, in the present example embodiment, a configuration in which a plurality of types of voltages is suppled to control respective control units is employed, the magnitudes or types of voltages do not need to be limited to this configuration in other embodiments.

The DCON control unit 10 includes, as built-in modules, a central processing unit (CPU) 11 (a main controller), a read-only memory (ROM) 12, and a random access memory (RAM) 13. For example, the image forming unit 15 and a display panel 71 are connected to the DCON control unit 10. Moreover, a network connection unit 84, which performs connection to an external apparatus (not illustrated) via a network, is connected to the DCON control unit 10.

The ROM 12 (a main storage unit or a third storage unit) stores various programs related to control of the image forming apparatus 1 and various pieces of image data. Although details are described below, the ROM 12 previously stores data about images related to the maintenance of the image forming apparatus 1. The CPU 11 performs various computational processing operations based on a control program stored in the ROM 12. The RAM 13 (an auxiliary storage unit) temporarily stores data. Thus, the CPU 11 controls, for example, the image forming unit 15 and the reader 14 and the post-processing apparatus 16, which are connected to a CPU 130, while using the RAM 13 as a work area based on a control program stored in the ROM 12, to perform the above-described image forming operation. Furthermore, the data previously stored in the ROM 12, such as data about images related to the maintenance of the image forming apparatus 1, can be stored in not the ROM 12 but a server connected to the image forming apparatus 1 by wire or by wireless. In this case, the CPU 11 temporarily migrates (stores), to the RAM 13, for example, image data related to the maintenance of the image forming apparatus 1 stored in the server, and transmits such image data from the RAM 13 to an image reception unit 93 (FIG. 5) of the wireless operation unit 50 via an image transmission unit 83.

Moreover, a panel connection unit 80, which performs connection with the wireless operation unit 50, is connected to the DCON control unit 10. The panel connection unit 80 is equipped with the feeding connector 73a and includes the panel attachment portion 73, to which the wireless operation unit 50 is connected, and a wireless communication unit 81 (a first communication unit), which performs wireless communication with the wireless operation unit 50. The charging connector 55 of the wireless operation unit 50 is connected to the feeding connector 73a of the panel attachment portion 73.

The wireless communication unit 81 includes a command communication unit 82 (an example of each of a transmission unit and a reception unit) and the image transmission unit 83. The CPU 11 reads out an image stored in the ROM 12, and transmits the image (data about a screen) to the wireless operation unit 50 via the image transmission unit 83 of the wireless communication unit 81. Moreover, as mentioned above, the CPU 11 reads out an image temporarily stored in the RAM 13, and transmits the image (data about a screen) to the wireless operation unit 50 via the image transmission unit 83 of the wireless communication unit 81.

The CPU 11 generates an instruction for the wireless operation unit 50, and transmits the instruction to the wireless operation unit 50 via the command communication unit 82. Moreover, the CPU 11 receives a notification or instruction generated by the wireless operation unit 50 via the command communication unit 82. Furthermore, while, in the present example embodiment, the command communication unit 82 and the image transmission unit 83 are configured to be separate units, a configuration in which both units are integrated into a single communication line can be employed in other embodiments.

Moreover, while, in the present example embodiment, a single CPU 11 controls both the command communication unit 82 and the image transmission unit 83, the present invention is not limited to such a configuration. For example, a configuration in which a plurality of CPUs is provided and at least one CPU out of them controls both the command communication unit 82 and the image transmission unit 83 can be employed in other embodiments. Naturally, a configuration in which different CPUs respectively control the command communication unit 82 and the image transmission unit 83 can also be employed in other embodiments.

Moreover, the image forming apparatus 1 and the wireless operation unit 50 perform wireless communication with each other via Wi-Fi direct communication, which is a communication form for directly interconnecting apparatuses. Miracast, which is a display transmission technique obtained by applying the method for Wi-Fi direct communication, is used in, for example, mobile phones, displays, and projectors. Furthermore, the method for wireless communication is not limited to Wi-Fi direct communication, but can use a configuration for performing wireless communication with, for example, a Wi-Fi router used as an access point. However, from the viewpoint of security, it is favorable that the method for wireless communication is Wi-Fi direct communication. Moreover, a configuration for not performing wireless communication using Wi-Fi but performing wireless communication using another method, such as Bluetooth or NFC, can be employed in other embodiments.

Moreover, the power source device 17 is connected to the DCON control unit 10. The power source device 17 receives supply of electric power from a commercial electric power source via an electric outlet plug 19, converts the received electric power into electric power for use in each device, and supplies the electric power to each device. Specifically, first, when the main power switch 79 is changed from turning-off to turning-on, the power source device 17 supplies electric power to the DCON control unit 10. After that, the power source device 17 supplies electric power to, for example, the reader 14, the image forming unit 15, the post-processing apparatus 16, the display panel 71, the wireless operation unit 50 attached to the panel attachment portion 73, the wireless communication unit 81, and the network connection unit 84 based on an instruction issued from the DCON control unit 10.

Moreover, the SCON control unit 200 includes a CPU 120 and performs system control of the entire image forming apparatus 1 and control for, for example, image processing of an image read by the reader 14. The SCON control unit 200 performs control of the entire image forming apparatus 1 and is, therefore, always supplied with a power source voltage of +5 V in response to the image forming apparatus 1 being connected to a commercial power source.

Then, the RCON control unit 300 includes the CPU 130, and performs control of the reader 14 and the post-processing apparatus 16. Here, the RCON control unit 300 outputs an image read via the reader 14 to the CPU 120. Upon receiving the image, the CPU 120 generates image processing information which is used for image formation which the DCON control unit 10 performs by controlling, for example, a driving motor.

Furthermore, the DCON control unit 10, the SCON control unit 200, and the RCON control unit 300 are not limited to having the above-described configurations, and can be units including, for example, an application specific integrated circuit (ASIC) or another type of CPU to perform each control operation.

Here, the image forming apparatus 1 in the present example embodiment is configured to be able to transition to a plurality of states such as a standby mode (a start-up state or a first mode), in which an image forming operation is ready to be performed, and a sleep mode (a sleep state or a second mode), which is a power saving state in which supplying of power source voltages to respective control units is restricted and power consumption is smaller than in the state in which an image forming operation is ready to be performed. Here, the standby mode is a state in which the main power switch 79 is in an ON-state and power source voltages are being supplied to the DCON control unit 10, the SCON control unit 200, and the RCON control unit 300. Thus, the standby mode is a state in which power source voltages are supplied to all of the control units so that an image forming operation is ready to be performed.

Moreover, when being in the standby mode, the image forming apparatus 1 is able to receive various commands such as an "execution command" and a "setting command" described above. Furthermore, "being able to receive" means a state in which the CPU 11 is aware that the wireless communication unit 81 has received a command, and refers to a state in which, if the received command is, for example, an execution command for starting copying, an image forming operation begins in response to the execution command being received. Thus, a state in which, even if transmission of a command from the wireless operation unit 50 is completed (an icon for copying has been touched), an image forming operation does not begin in response to such a completion is a state of "not receiving" a command.

There is another method of determining whether the image forming apparatus 1 is in a state of being able to receive a command. For example, suppose a state in which the display panel 71 of the image forming apparatus 1 is turned off. In this state, assumed that an icon for "copy" in the wireless operation unit 50 has been touched. At this time, if the display panel 71 does not transition from the turning-off state to the turning-on state, the current state of the image forming apparatus 1 is a state of not receiving a command.

Moreover, the sleep mode is a state in which, while a power source voltage is being supplied to the SCON control unit 200, power source voltages to the DCON control unit 10 and the RCON control unit 300 are blocked.

Furthermore, the transition from the sleep mode to the standby mode and the transition from the standby mode to the sleep mode are performed in response to an operation performed by the user (an operator or a service engineer) such as a sleep key (not illustrated) provided in the wireless operation unit 50 being operated. At this time, when the sleep key of the wireless operation unit 50 is operated, a seep signal is output from the wireless operation unit 50 to the power source device 17. Upon receiving the sleep signal, the power source device 17 controls each of the DCON control unit 10, the SCON control unit 200, and the RCON control unit 300 to cause the image forming apparatus 1 to transition to the sleep mode. Moreover, the sleep mode can be a mode to which the image forming apparatus 1 transitions from the turning-on state of the main power switch 79 (power SW_ON state) in a case where the image forming apparatus 1 has not been operated for more than a predetermined time, i.e., in a case where a period for which an instruction for image formation to the image forming apparatus 1 has not been issued has exceeded a predetermined time. The predetermined time here can be, for example, a time previously set (for example, 60 seconds) or can be a time settable by the user to an optional time.

The predetermined time here is measured by a timer (counter) 202, which is controlled by the DCON control unit 10. The timer 202 counts a time for determining timing at which the image forming apparatus 1 transitions from the standby mode to the sleep mode. Specifically, the timer 202 measures a time for which an instruction for image formation to the image forming apparatus 1 has not been issued by the user. With regard to measurement, the timer 202 can measure an actual time or can perform unique counting based on an actual time. With regard to a count value for counting, the timer 202 can perform counting in an incrementing manner, such as 1 second, 2 seconds, 3 seconds, . . . , in this order or can perform counting in a decrementing manner, such as 60 seconds, 59 seconds, 58 seconds, . . . , in this order. Moreover, in the present example embodiment, the instruction for image formation to the image forming apparatus 1 means, for example, a print job being transmitted to the image forming apparatus 1. Moreover, the timing at which an instruction for image formation has become not issued refers to timing at which image forming processing performed by the image forming unit 15 has ended. Specifically, that timing is timing at which the rotation of the photosensitive drums 9 has stopped. However, that timing is not limited to timing at which the rotation of the photosensitive drums 9 has stopped, and can be, for example, timing at which the rotation of the intermediate transfer belt 6 has stopped or timing at which a sheet with a toner image transferred thereto has been discharged to the discharge tray 16a.

Next, states of the image forming apparatus 1 in the present example embodiment are described with reference to Table 1. Here, a power SW_ON state (a standby mode), in which the main power switch 79 is in a turning-on state, a sleep mode, which is lower in power consumption than the power SW_ON state, and a power SW_OFF state, in which the main power switch 79 is in a turning-off state, are described as examples.

Here, each of the sleep mode and the power SW_OFF state is a state which is smaller in the power source voltage to be suppled and is more limited in operating functions than the power SW_ON state (hereinafter referred to as a "standby mode"). Furthermore, in the present example embodiment, the power SW_ON state is an example of a first state (start-up state or standby mode), in which image forming processing by the image forming apparatus 1 is able to be performed, and each of the sleep mode and the power SW_OFF state is an example of a second state (sleep mode), which is smaller in power consumption than the first state.

These three states are described with reference to the following Table 1.

TABLE 1

| State | DCON | SCON | RCON | +24 V | +12 V | +5 V | HDD | Fixing | Power source fan |
|---|---|---|---|---|---|---|---|---|---|
| Power SW_ON | Yes | Yes | Yes | Yes | Yes | Yes | Yes | Yes | Yes |
| Sleep | No | Yes | No | Yes | Yes | Yes | Yes | No | Yes |
| Power SW_OFF | No | Yes | No | No | No | Yes | No | No | No |

As mentioned above, in a case where the image forming apparatus 1 is connected to, for example, a commercial power source via, for example, an electric outlet, the power source device 17 supplies a power source voltage of +5 V as always-on electric power to the SCON control unit 200. Then, in response to the main power switch 79 being turned on, the power source device 17 supplies, in addition to +5 V, power source voltages of +12 V and +24 V as non-always-on electric power to each of the DCON control unit 10, the SCON control unit 200, and the RCON control unit 300.

As shown in Table 1, in a case where the image forming apparatus 1 is in the power SW_ON state (standby mode), since the main power switch 79 is turned on, power source voltages of +5 V, +12 V, and +24 V are supplied to each of the SCON control unit 200, the DCON control unit 10, and the RCON control unit 300. Therefore, for example, a heating portion (not illustrated) of the fixing device 70, which is driven by the DCON control unit 10, and a power source fan for cooling the power source device 17 are driven. Thus, when being in the power SW_ON state, the image forming apparatus 1 is able to perform all of the functions and becomes ready to perform image formation. Furthermore, in the present example embodiment, the standby mode refers to a state in which the power switch 79 is turned on with the image forming apparatus 1 connected to a commercial power source and a start-up control operation such as a pre-rotation operation is completed.

Next, the sleep mode is described. The sleep mode is a state in which the main power switch 79 is turned on and power source voltages of +5 V, +12 V, and +24 V are supplied to the power source device 17. Then, power source voltages of +5 V and +12 V are supplied from the power source device 17 to the SCON control unit 200.

Furthermore, in the sleep mode, supplying of power source voltages to the DCON control unit 10 and the RCON control unit 300 are blocked. Thus, in the sleep mode, execution of the functions which are controlled by the DCON control unit 10 and execution of the functions which are controlled by the RCON control unit 300 are restricted. In other words, in the sleep mode, the image forming apparatus 1 is not able to perform an image forming operation and an image reading operation.

Moreover, since, in the sleep mode, power source voltages are supplied from the power source device 17 to the SCON control unit 200, even in the sleep mode, the SCON control unit 200 is able to output a turning-on or turning-off signal to the power source fan (not illustrated) connected to the power source device 17. Then, the power source fan is supplied with power source voltages of +12 V and +24 V from the power source device 17 under the control of the SCON control unit 200 and is thus able to be rotationally driven. Thus, even in the sleep mode, the SCON control unit 200 is able to control the power source fan for cooling the power source device 17.

Moreover, the SCON control unit 200 is supplied with power source voltages from the power source device 17 and is thus able to control a hard disk drive (HDD) for storing, for example, image data or addresses.

On the other hand, in the power SW_OFF state, only a power source voltage of +5 V is supplied to the SCON control unit 200. Accordingly, as compared with the sleep mode, the power SW_OFF state is smaller in power consumption and is more limited in available functions.

Moreover, in the power SW_OFF state, as with the sleep mode, supplying of power source voltages to the DCON control unit 10 and the RCON control unit 300 is blocked. Thus, in the power SW_OFF state, execution of the functions which are controlled by the DCON control unit 10 and execution of the functions which are controlled by the RCON control unit 300 are restricted. In other words, in the power SW_OFF state, as with the sleep mode, the image forming apparatus 1 is not able to perform an image forming operation and an image reading operation. Moreover, in the power SW_OFF state, since a power source voltage to be supplied to the SCON control unit 200 is smaller than in the sleep mode, available functions are more restricted than in the sleep mode.

Thus, in the sleep mode, since a power source voltage to be supplied to the SCON control unit 200 is large, the image forming apparatus 1 is able to drive the HDD for storing, for example, image data or addresses and the power source fan for cooling the power source device 17. On the other hand, in the power SW_OFF state, since a power source voltage to be supplied to the SCON control unit 200 is smaller than in the sleep mode, the image forming apparatus 1 is unable to drive the HDD and the power source fan. In this way, the power SW_OFF state is more restricted in available functions than the sleep mode, and is, therefore, smaller in power source voltages to be supplied and less in power consumption than the sleep mode.

As mentioned above, in the present example embodiment, the image forming apparatus 1 is configured to be able to transition from the standby mode to the sleep mode. This state transition is performed, as mentioned above, in a case where the user has performed setting to the power-saving state via the wireless operation unit 50. Moreover, in a case where a state in which the image forming apparatus 1 does not operate has continued for a predetermined time or more, the image forming apparatus 1 transitions from the standby mode to the sleep mode.

Furthermore, with regard to the sleep mode, the image forming apparatus 1 can be configured to have not only one sleep mode but also a plurality of sleep modes. For example, the image forming apparatus 1 can be configured to have a first sleep mode and a second sleep mode which is more restricted in available functions than the first sleep mode. In a case where the image forming apparatus 1 has a plurality of sleep modes in this way, the image forming apparatus 1 can be configured to allow the user to select a sleep mode to which the image forming apparatus 1 transitions in a case where a state in which the image forming apparatus 1 does not operate has continued for a predetermined time or more. Moreover, the image forming apparatus 1 can be configured to transition to the first sleep mode in a case where the image forming apparatus 1 does not operate for a predetermined time or more and to transition to the second sleep mode in a case where the image forming apparatus 1 further does not operate for a predetermined time or more from the first sleep mode.

Moreover, the transition from the sleep mode to the standby mode is performed, as mentioned above, in a case where an operation by the user has been performed, such as a case where the wireless operation unit 50 has been operated. At this time, the power source device 17 supplies power source voltages to the DCON control unit 10 and the RCON control unit 300 in response to the wireless operation unit 50 being operated. Furthermore, the transition from the sleep mode to the standby mode can be performed in response to the image forming apparatus 1 receiving an image forming job or can be performed in response to a sensor (not illustrated), which is supplied with a power source voltage even at the time of the sleep mode, detecting that the image forming apparatus 1 has been operated.

<System Configuration of Wireless Operation Unit>

Next, a system configuration of the wireless operation unit 50 is described.

Figure 5:
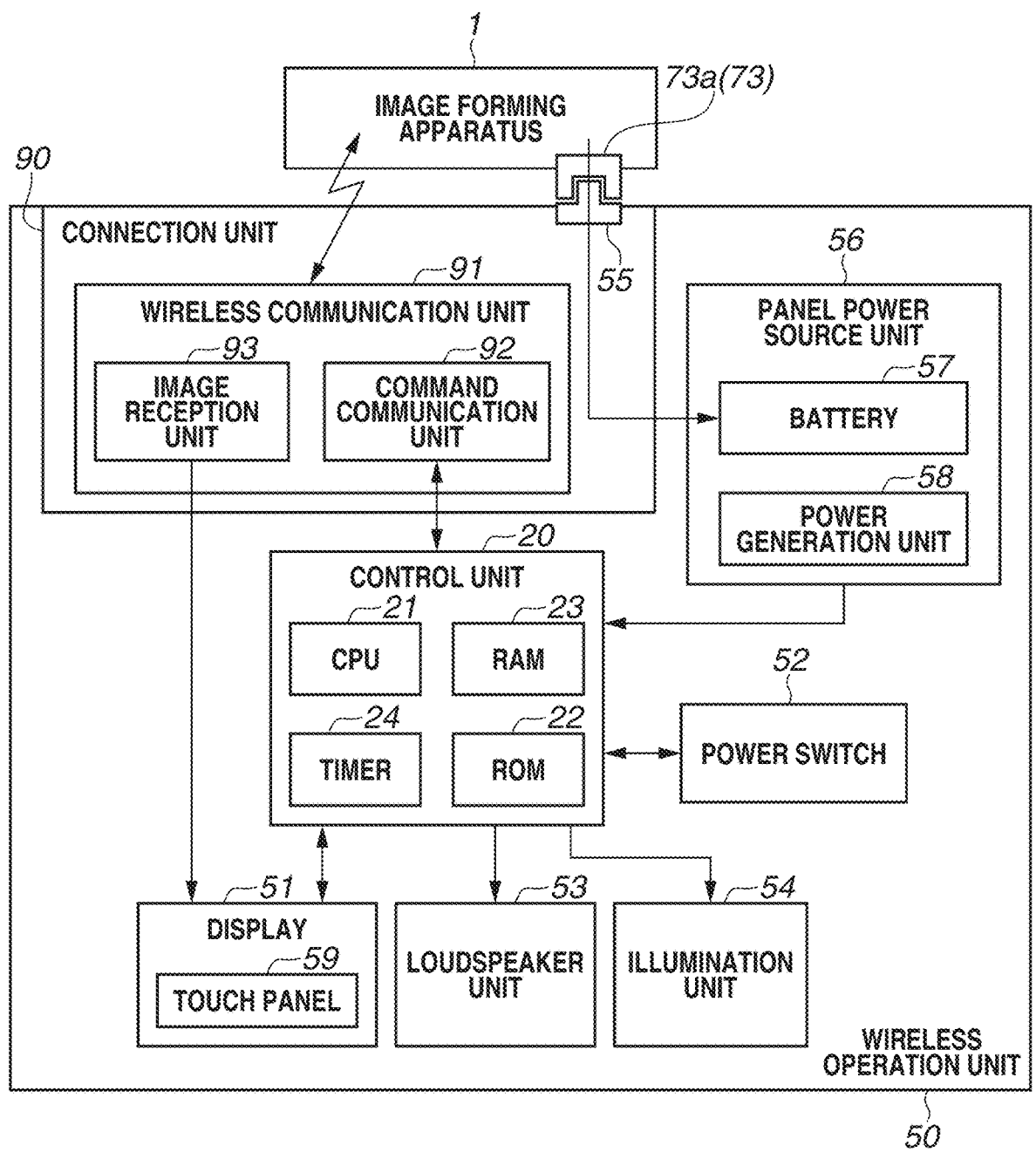
FIG. 5 is a block diagram illustrating a system configuration of the wireless operation unit according to one embodiment.

FIG. 5 is a block diagram illustrating a system configuration of the wireless operation unit 50. As illustrated in FIG. 5, the wireless operation unit 50 includes a control unit 20, which includes a CPU 21 (an operation controller), a ROM 22 (a storage unit), a RAM 23, and a timer 24. The timer 24 performs time measurement used for the control unit 20 to perform various processing operations.

The ROM 22 stores data such as various programs related to control of the wireless operation unit 50. The CPU 21 performs various computational processing operations based on a control program stored in the ROM 22. The RAM 23 temporarily stores data. Thus, the CPU 21 controls, for example, the display 51, the loudspeaker unit 53, and the illumination unit 54, which are connected to the control unit 20, while using the RAM 23 as a work area based on a control program stored in the ROM 22. The CPU 21 can be configured to temporarily store, in the RAM 23, data about an image transmitted from the image transmission unit 83 of the image forming apparatus 1 to the image reception unit 93 of the wireless operation unit 50. The CPU 21 is able to display an image on the display 51 based on the data temporarily stored in the RAM 23. Furthermore, the CPU 21 is also able to display, on the display 51, data about an image received by the image reception unit 93 without temporarily storing the data in the RAM 23. For example, a moving image related to the maintenance of the image forming apparatus 1 is configured with a plurality of screens. Data about images corresponding to a plurality of screens constituting a given moving image can be collectively transmitted at one time from the image transmission unit 83 of the image forming apparatus 1 to the image reception unit 93 of the wireless operation unit 50, and data about such images can be temporarily stored in the RAM 23. The CPU 21 sequentially reads out data about such images from the RAM 23 and displays the data on the display 51. Since it is not necessary to repeatedly perform a procedure of first wirelessly transmitting data about one image and displaying a screen on the display 51 based on the data, at the time of displaying a given moving image, a period of time required for the image reception unit 93 from when receiving data about the first screen until when receiving data about the last screen becomes short. Thus, it is possible to reduce such a concern that communication may become unstable during displaying of a moving image and the moving image may end in the middle. Moreover, the wireless operation unit 50 includes a connection unit 90, which performs connection with the image forming apparatus 1. The connection unit 90 includes the charging connector 55, which is connected to the feeding connector 73a of the image forming apparatus 1, and a wireless communication unit 91 (a second communication unit), which performs wireless communication with the image forming apparatus 1.

The wireless communication unit 91 includes a command communication unit 92 (an example of a transmission unit or a reception unit), which is connected to the CPU 21, and the image reception unit 93, which is connected to the display 51. The CPU 21 generates an instruction or notification for the image forming apparatus 1 and transmits the instruction or notification to the command communication unit 82 of the image forming apparatus 1 via an antenna (not illustrated) of the command communication unit 92. Although details are described below, the command communication unit 92 transmits, to the command communication unit 82 of the image forming apparatus 1, data about a touch position in a case where the display 51 has been touched by the user. Moreover, the command communication unit 92 transmits, to the command communication unit 82 of the image forming apparatus 1, a command indicating that a predetermined icon has been touched. Moreover, the CPU 21 receives, via the command communication unit 92, an instruction or information transmitted from the command communication unit 82 of the image forming apparatus 1.

The image reception unit 93 receives, via an antenna (not illustrated), image data transmitted from the image transmission unit 83 of the image forming apparatus 1, converts the received image data into image data to be displayed on the display 51, and displays the obtained image data on the display 51. Furthermore, while, in the present example embodiment, the command communication unit 92 and the image reception unit 93 are configured to be separate units, a configuration in which both units are integrated into a single communication line can be employed in other embodiments.

Moreover, while, in the present example embodiment, a single CPU 21 controls both the command communication unit 92 and the image reception unit 93, the invention is not limited to such a configuration. For example, in other embodiments, a configuration in which a plurality of CPUs is provided and at least one CPU out of them controls both the command communication unit 92 and the image reception unit 93 can be employed. Naturally, a configuration in which different CPUs respectively control the command communication unit 92 and the image reception unit 93 can also be employed in other embodiments.

Moreover, the wireless operation unit 50 includes a panel power source unit 56. The panel power source unit 56 includes the battery 57 and a power generation unit 58. The battery 57 is a main power source for the wireless operation unit 50, and is configured with rechargeable cells. When the charging connector 55 is connected to the feeding connector 73a of the image forming apparatus 1, electric power is supplied from the power source device 17 of the image forming apparatus 1 to the battery 57, so that the battery 57 is charged. Moreover, the power generation unit 58 adjusts electric power of the battery 57 to voltages which are usable by the respective devices included in the wireless operation unit 50. When the power switch 52 is switched from turning-off to turning-on, electric power charged in the battery 57 and adjusted by the power generation unit 58 is supplied to the control unit 20, the display 51, the loudspeaker unit 53, the illumination unit 54, and the connection unit 90.

<Wireless Communication between Image Forming Apparatus and Wireless Operation Unit>

Next, a wireless communication between the image forming apparatus 1 and the wireless operation unit 50 is described.

Figure 6:
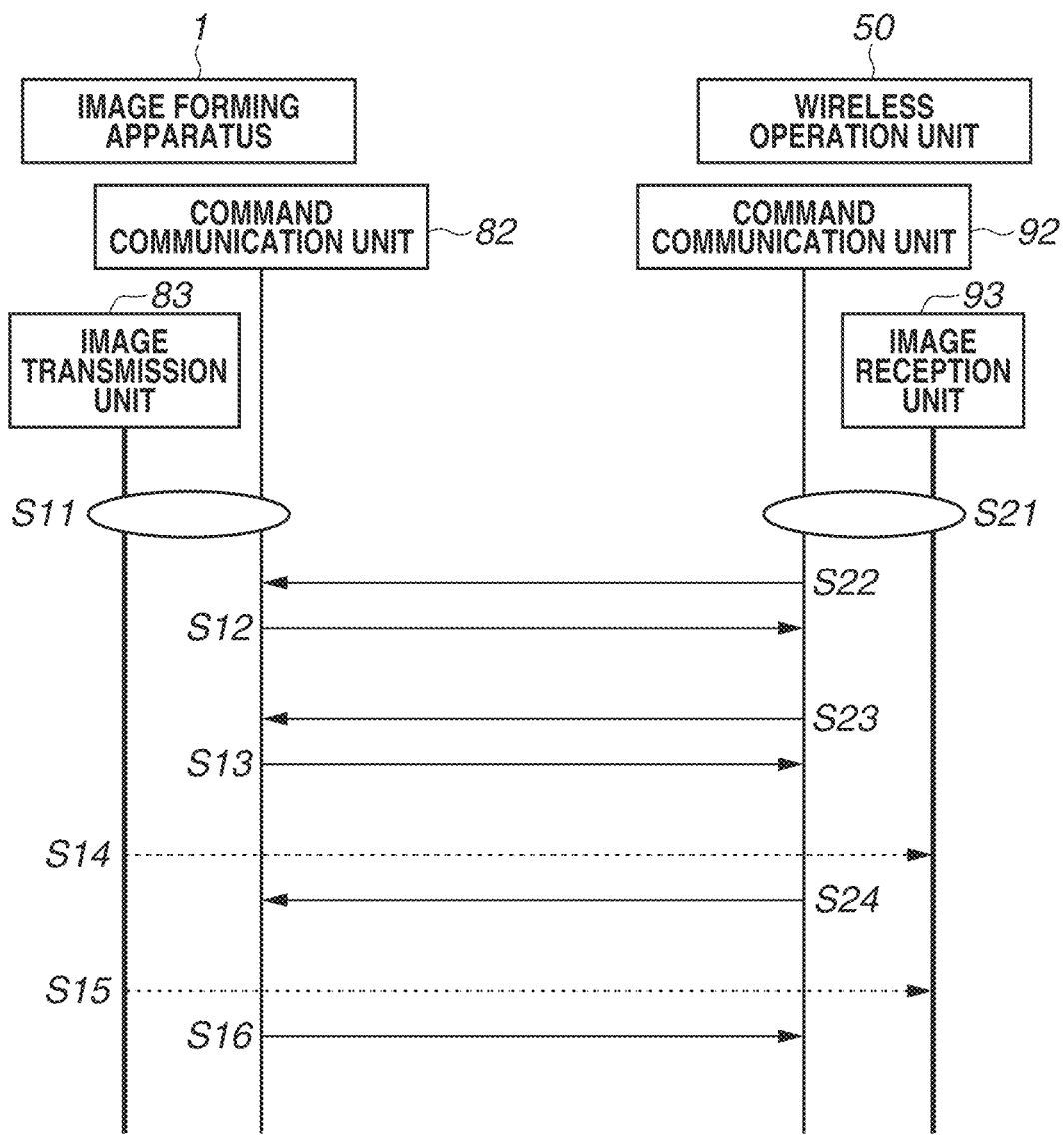
FIG. 6 is a transition diagram for communications between the image forming apparatus and the wireless operation unit according to one embodiment.

FIG. 6 is a transition diagram for communications between the image forming apparatus 1 and the wireless operation unit 50. In a case where a wireless communication is performed between the image forming apparatus 1 and the wireless operation unit 50, first, in step S11, the user starts up the image forming apparatus 1 by operating the main power switch 79, and, in step S21, the user starts up the wireless operation unit 50 by operating the power switch 52.

When the wireless operation unit 50 is started up, then in step S22, the command communication unit 92 of the wireless operation unit 50 transmits a negotiation request to the command communication unit 82 of the image forming apparatus 1. Next, in step S12, the command communication unit 82 of the image forming apparatus 1 transmits a response signal to the command communication unit 92 of the wireless operation unit 50. When the wireless operation unit 50 receives the response signal, a connection sequence ends, so that a wireless communication is established.

Next, in step S13 and step S23, conditions for wireless communication, such as communication speed and image compression rate, are mutually set between the image forming apparatus 1 and the wireless operation unit 50 via the command communication units 82 and 92. Upon completion of such setting, in step S14, in response to an instruction from the CPU 11 of the image forming apparatus 1, the image transmission unit 83 of the image forming apparatus 1 transmits a signal about an image (data about a first screen) stored in the ROM 12 of the image forming apparatus 1 to the image reception unit 93 of the wireless operation unit 50. Furthermore, the CPU 11 can be configured to control the image transmission unit 83 in such a way as to temporarily store a signal about an image stored in the ROM 12 in the RAM 13 and then transmit the signal about an image to the image reception unit 93. Thus, a configuration in which the signal about an image is transmitted from the ROM 12 to the image reception unit 93 without via the RAM 13 can be employed, or a configuration in which the signal about an image is transmitted from the ROM 12 to the image reception unit 93 via the RAM 13 can be employed.

Next, the image reception unit 93 of the wireless operation unit 50 converts the received signal about an image and displays the image (a first screen) on the display 51. At this time, the CPU 21 can temporarily store the signal about an image received by the image reception unit 93 in the RAM 23. Then, the CPU 21 can read out the signal about an image received by the image reception unit 93 from the RAM 23 and display the image on the display 51.

After that, when the user has operated the display 51, in step S24, the CPU 21 of the wireless operation unit 50 transmits operation information about the display 51 to the command communication unit 82 of the image forming apparatus 1 via the command communication unit 92.

Figure 7:
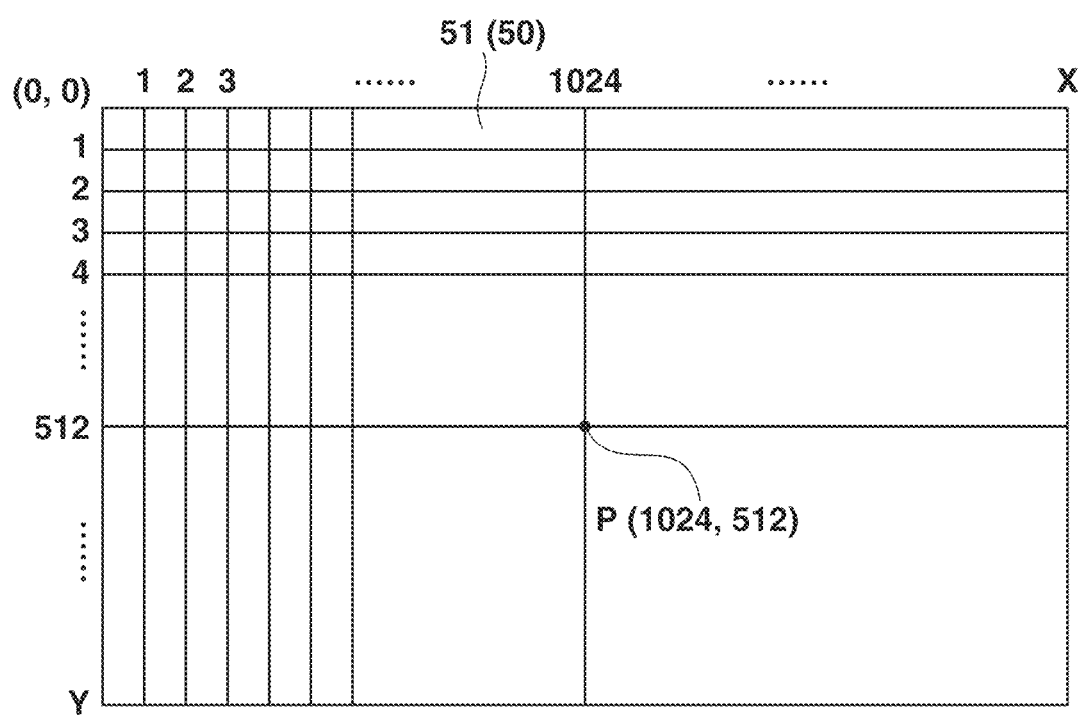
FIG. 7 is a diagram illustrating coordinate display provided on a display of the wireless operation unit according to one embodiment.

Here, the CPU 21 transmits operation information about the display 51 as coordinate information (data about a position) to the image forming apparatus 1. In the following description, this is described. FIG. 7 is a diagram illustrating coordinate display provided on the display 51 of the wireless operation unit 50. As illustrated in FIG. 7, the display 51 is divided in each of the X-direction and the Y-direction. While the number of divisions depends on, for example, the type of a touch panel, a resistance-type touch panel in the present example embodiment has 2,048 divisions in the X-direction and 1,024 divisions in the Y-direction.

Coordinates are based on the origin (0, 0) and are represented by (X, Y) according to distances from the origin. For example, a position P illustrated in FIG. 7 is located at a position "1024" in the X-direction and "512" in the Y-direction away from the origin and is, therefore, represented by (1024, 512) as coordinates. The coordinate data is transmitted from a touch panel 59 (illustrated in FIG. 5 and serving as a touch position detection unit) of the display 51 to the CPU 21 of the wireless operation unit 50 and is then transmitted from the command communication unit 92 to the image forming apparatus 1 in response to an instruction from the CPU 21. Furthermore, in the present example embodiment, communications between the image forming apparatus 1 and the wireless operation unit 50 are performed with an 8-bit length, numerical values of the coordinate data are reduced to ⅛ to be transmitted. Thus, in a case where the coordinates are (1024, 512), the coordinate data is replaced by (128, 64) to be transmitted.

The CPU 11 of the image forming apparatus 1 determines which position the user has touched on the display 51 of the wireless operation unit 50 based on the input coordinate data. Then, in steps S15 and S16, depending on the touched position, the CPU 11 of the image forming apparatus 1 issues instructions to the wireless operation unit 50 for, for example, transmission of image data, turning-on control of the illumination unit 54, and turning-on or turning-off of sound by the loudspeaker unit 53. Furthermore, even in cases other than the case where the image forming apparatus 1 has received operation information about the display 51 from the wireless operation unit 50, depending on the state of the image forming apparatus 1 or the state of the wireless operation unit 50, the CPU 11 of the image forming apparatus 1 issues the above-mentioned instructions to the wireless operation unit 50.

Figure 8A:
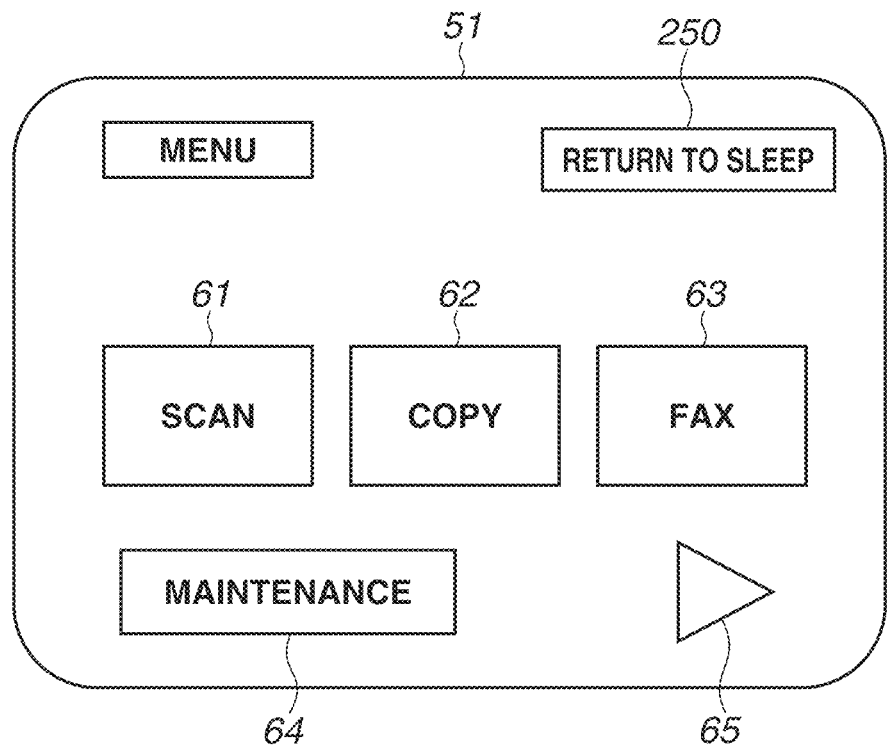
FIGS. 8A and 8B are diagrams illustrating examples of images each of which is displayed on the display of the wireless operation unit according to one embodiment.

Next, transitioning of images which is performed when the display 51 of the wireless operation unit 50 has been operated is described with reference to FIGS. 8A and 8B to FIGS. 10A and 10B. FIGS. 8A and 8B to FIGS. 10A and 10B illustrate examples of images each of which is displayed on the display 51 of the wireless operation unit 50. As illustrated in FIG. 8A, on the display 51 of the wireless operation unit 50, first, an operation screen G1 (see FIG. 9) serving as a main menu screen illustrated in FIG. 8A is displayed by default. Thus, in step S14, data about an operation screen illustrated in FIG. 9 (data about a first screen) is transmitted from the image transmission unit 83 to the image reception unit 93. The main menu screen includes a scan button 61, which is used for setting the reader 14, a copy button 62, which is used for causing the image forming unit 15 to perform image formation, a FAX button 63, which is used for setting facsimile (FAX), a maintenance button 64, and an arrow button 65, which is used for switching the screen to a next page.

Figure 8B:
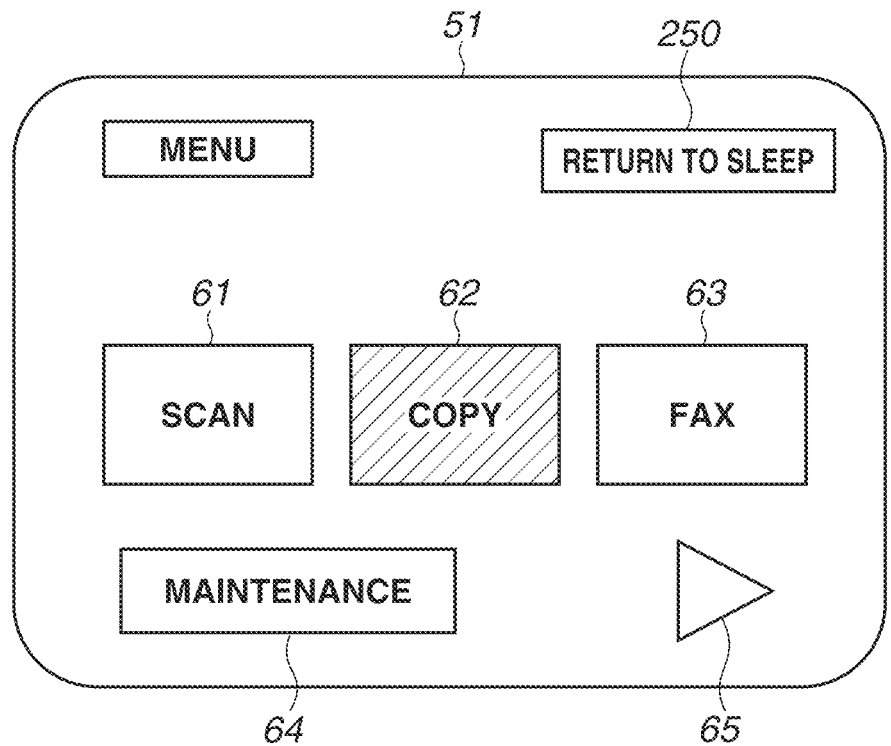

When determining that the user has selected the copy button 62 (an example of a first icon) based on the coordinate data transmitted from the wireless operation unit 50, the CPU 11 of the image forming apparatus 1 transmits an image with the copy button 62 displayed in gray illustrated in FIG. 8B (data about a screen indicating that the first icon has been touched) to the image reception unit 93 via the image transmission unit 83. This causes the image illustrated in FIG. 8B to be displayed on the display 51 of the wireless operation unit 50.

Figure 10A:
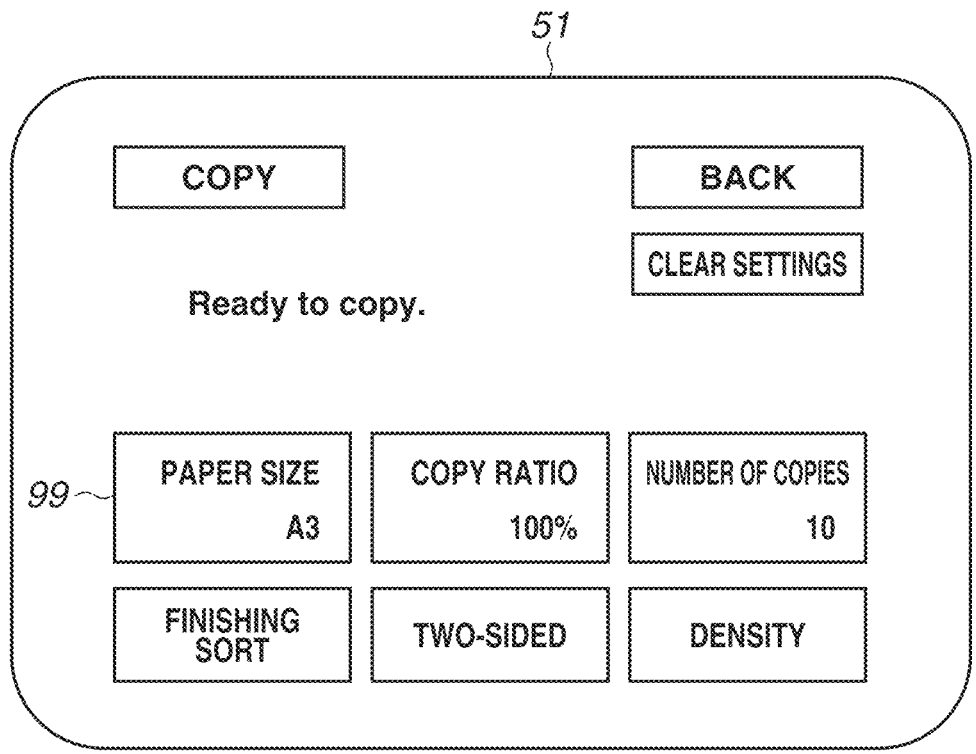
FIGS. 10A and 10B are diagrams used to explain a mechanism under which an operation screen transitions according to one embodiment.

Next, when a predetermined time has elapsed after the image illustrated in FIG. 8B is displayed on the display 51, the CPU 11 of the image forming apparatus 1 transmits the image of a copy screen illustrated in FIG. 10A to the image reception unit 93 via the image transmission unit 83. With this transmission, an image which is displayed on the display 51 of the wireless operation unit 50 is switched to the image illustrated in FIG. 10A. The screen illustrated in FIG. 10A is also a screen used for setting image forming conditions. The user is allowed to set various image forming conditions via this screen. The image forming conditions include, for example, a condition for paper size, a condition for copy ratio, and a condition for density. Additionally, a setting as to whether to perform stapling, which is processing using the post-processing apparatus 16, and, in the case of performing stapling, a setting as to where to perform stapling are also types of image forming conditions. The user is allowed to perform setting of such image forming conditions via the wireless operation unit 50.

Figure 10B:
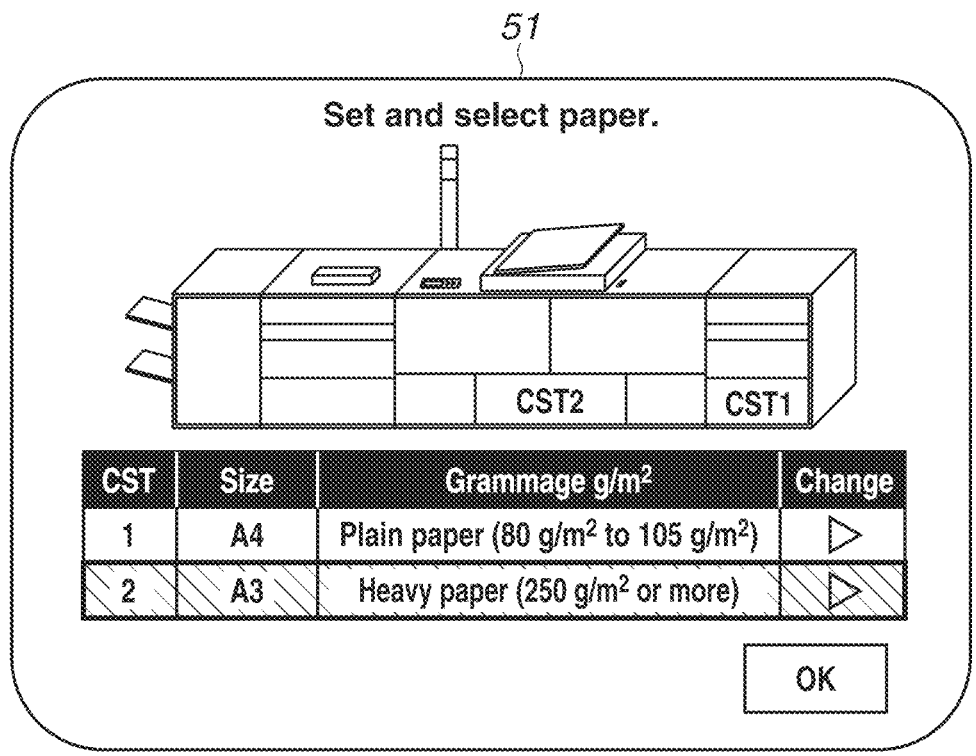

Next, when determining that the user has selected a paper size button 99 based on the coordinate data transmitted from the wireless operation unit 50, the CPU 11 (an example of a resetter) of the image forming apparatus 1 transmits the image of a paper setting screen illustrated in FIG. 10B to the image reception unit 93 via the image transmission unit 83. With this transmission, an image which is displayed on the display 51 of the wireless operation unit 50 is switched to the image illustrated in FIG. 10B. In the paper setting screen, an outer appearance of the image forming apparatus 1 and the size and grammage of each of sheets S stored in the sheet cassettes 75a and 75b are displayed.

Figure 9:
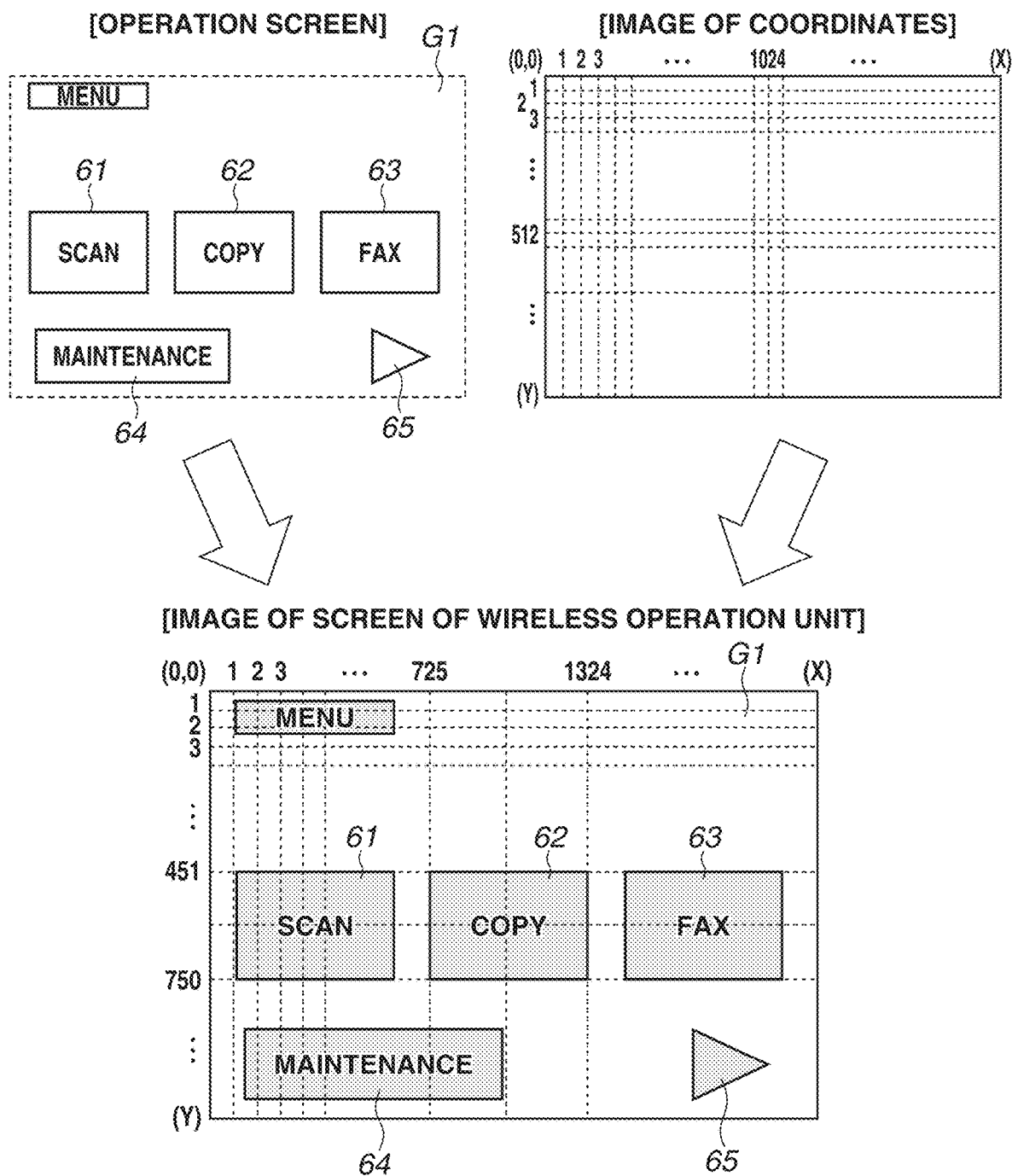
FIG. 9 is a diagram illustrating an example of an image which is displayed on the display of the wireless operation unit according to one embodiment.

Transitioning from the screen illustrated in FIG. 8A to the screen illustrate in FIG. 8B is described in more detail. FIG. 9 illustrates the operation screen G1, which the image transmission unit 83 of the image forming apparatus 1 transmits to the image reception unit 93 of the wireless operation unit 50. The wireless operation unit 50 in the present example embodiment does not have information about images to be displayed on the display 51. Therefore, the wireless operation unit 50 displays the operation screen G1 on the display 51 each time the wireless operation unit 50 receives the operation screen G1 from the image forming apparatus 1.

As also described in the above description, the wireless operation unit 50 transmits information about the position touched by the user as coordinate data to the image forming apparatus 1. As in an "image of coordinates" illustrated in FIG. 9, the wireless operation unit 50 stores the position touched by the user as coordinate data.

Moreover, FIG. 9 also illustrates an image of a screen of the wireless operation unit. Since, as in this image, the respective coordinates and the operation screen G1 overlap each other, the CPU 11 of the image forming apparatus 1 is able to associate various buttons (61 to 65) in the operation screen G1 with the coordinate data. In the example of the main menu screen illustrated in FIG. 9, if the x coordinates are "725" to "1324" and the y coordinates are "451" to "750", the CPU 11 determines that the copy button 62 has been pressed. Thus, the CPU 21 of the wireless operation unit 50 does not need to transmit a command indicating that the copy button has been pressed to the image forming apparatus 1 and only needs to transmit coordinate data indicating the position touched by the user to the image forming apparatus 1. Since the CPU 11 of the image forming apparatus 1 is aware of an image which is being displayed on the display 51 of the wireless operation unit 50, the CPU 11 is able to appropriately select a screen to be next transmitted to the wireless operation unit 50, based on the coordinate data transmitted from the wireless operation unit 50, and is also able to perform an operation such as execution of image formation or execution of scanning.

In this way, in the present example embodiment, images to be displayed on the display 51 of the wireless operation unit 50 are stored in the ROM 12 of the image forming apparatus 1, an image is transmitted from the image forming apparatus 1 to the wireless operation unit 50, and the transmitted image is displayed on the display 51. Then, information to be transmitted from the wireless operation unit 50 to the image forming apparatus 1 is essentially limited to "coordinate data (data about a position)", so that this configuration is able to reduce the amount of data to be stored in the ROM 22 as compared with a configuration in which images are stored in the ROM 22 of the wireless operation unit 50. Accordingly, it is possible to attain a reduction in the capacity of the ROM 22 and attain a reduction in production cost.

Moreover, as in the paper setting screen illustrated in FIG. 10B, displaying an outer appearance of the image forming apparatus 1 on the display 51 enables preventing the positions of the sheet cassettes 75a and 75b from being erroneously recognized by the user and thus leads to an improvement in usability. In the case of, to implement this, displaying an outer appearance of the image forming apparatus 1 on the display 51 of the wireless operation unit 50, a configuration of storing images in the ROM 22 of the wireless operation unit 50 requires the necessity of changing image data to be stored in the ROM 22 depending on types of the image forming apparatus 1. On the other hand, a configuration of displaying an image stored in the ROM 12 of the image forming apparatus 1 on the display 51 of the wireless operation unit 50 does not require the necessity of changing image data to be stored in the ROM 22 depending on types of the image forming apparatus 1. Accordingly, the wireless operation unit 50 can be used in a shared manner between a plurality of models of the image forming apparatus 1, so that it is possible to attain a reduction in production cost of the image forming apparatus 1 and the wireless operation unit 50.

Moreover, the image forming apparatus 1 in the present example embodiment has a configuration in which some of images to be displayed on the display 51 are stored in the ROM 22 of the wireless operation unit 50. Specifically, image data about images (data about a second screen) illustrated in FIGS. 8A and 8B and FIGS. 10A and 10B are previously stored as images related to the image forming apparatus 1 in the ROM 22 of the wireless operation unit 50. The CPU 21 controls the display 51 to switch which of an image that is based on image data stored in the ROM 22 (a second screen) and an image that is based on image data received by the image reception unit 93 (a first screen) to display as an image to be displayed on the display 51. The CPU 21 can temporarily store image data stored in the ROM 22 in the RAM 23 and then read out the image data from the RAM 23 and display, on the display 51, an image that is based on the read-out image data. Similarly, the CPU 21 can also temporarily store image data received by the image reception unit 93 in the RAM 23 and then read out the image data from the RAM 23 and display, on the display 51, an image that is based on the read-out image data. Furthermore, usually, the storage region of the RAM 23 is smaller than that of the ROM 22. Therefore, when the display 51 is displaying the second screen, data about the first screen is still not stored in the RAM 23.

Figure 11:
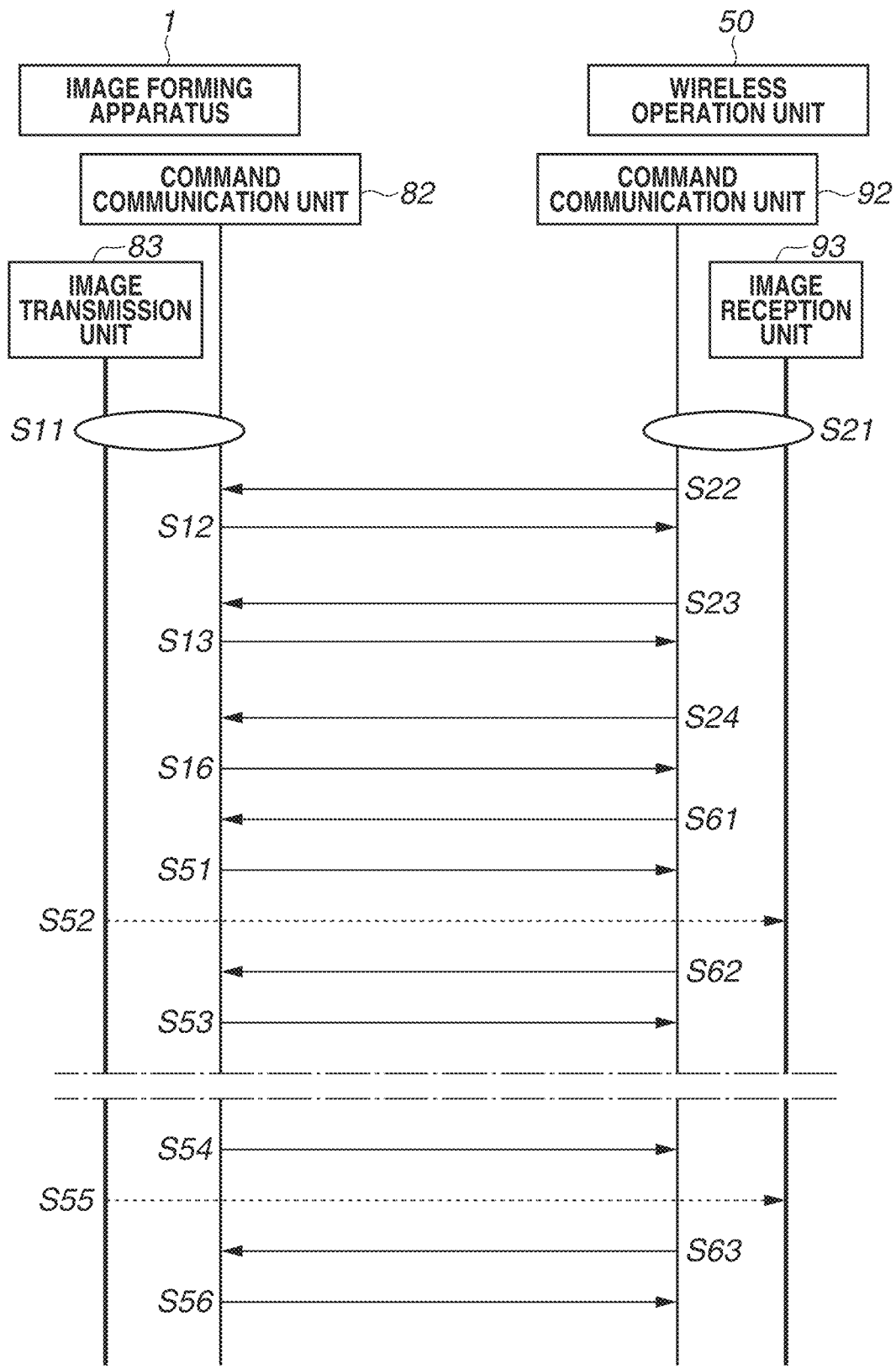
FIG. 11 is a transition diagram for communications between the image forming apparatus and the wireless operation unit according to one embodiment.

FIG. 11 is a transition diagram for communications between the image forming apparatus 1 and the wireless operation unit 50. In the following description, steps for performing processing operations similar to those described above in the present example embodiment with reference to FIG. 6 are assigned the respective same step numbers and the description thereof is omitted or simplified. As illustrated in FIG. 11, first, in step S11, the user starts up the image forming apparatus 1 by operating the main power switch 79, and, in step S21, the user starts up the wireless operation unit 50 by operating the power switch 52. When, in response to the power switch 52 being turned on, electric power is supplied from the panel power source unit 56 to the display 51, the display 51 is turned on. At this time, on the display 51, first, a main menu screen (a second screen) is displayed. Image data about the main menu screen to be displayed is previously stored in the ROM 22. Thus, data about a screen which is first displayed on the display 51 in response to the power switch 52 being turned on is previously stored in the ROM 22. Therefore, it is possible to decrease a period of time required from when the power switch 52 is turned on until a screen is displayed on the display 51, as compared with a case where the wireless operation unit 50 obtains data about an image transmitted from the image forming apparatus 1. Moreover, even in a state in which the image forming apparatus 1 is currently not powered on, it is possible to display a screen on the display 51.

Next, in steps S12 and S22, transmission and reception of a negotiation request and a response signal are performed between the command communication unit 92 of the wireless operation unit 50 and the command communication unit 82 of the image forming apparatus 1, so that a wireless communication is established between the image forming apparatus 1 and the wireless operation unit 50. After that, in steps S13 and S23, conditions for wireless communication, such as a communication speed and an image compression ratio, are mutually set via the command communication unit 92 of the wireless operation unit 50 and the command communication unit 82 of the image forming apparatus 1. Upon completion of this setting, the CPU 21 of the wireless operation unit 50 displays, as an image to be displayed on the display 51, a main menu screen (operation screen G1), which is an example of the second screen illustrated in FIG. 8A and is an image stored in the ROM 22. Furthermore, the CPU 21 can be configured to temporarily store data about the second screen read out from the ROM 22 in the RAM 23 and then read out the data about the second screen from the RAM 23.

The main menu screen does not much vary depending on respective image forming apparatuses. Accordingly, even in a case where the wireless operation unit 50 is shared by a plurality of image forming apparatuses, the main menu screen can be standardized. This enables reducing exchange of screen information performed between the wireless operation unit 50 and the image forming apparatuses, so that the stability of communication increases. Moreover, since the user is able to use a familiar main menu screen with respect to different image forming apparatuses, operability improves.

In this way, in the present example embodiment, while the image forming apparatus 1 transmits data about the first screen to the wireless operation unit 50, the image forming apparatus 1 does not transmit data about the second screen to the wireless operation unit 50. Decreasing data about screens to be previously stored in the ROM 22 of the wireless operation unit 50 even if only slightly enables reducing the capacity of the ROM 22 of the wireless operation unit 50 and thus achieving a reduction in size and cost of the wireless operation unit 50.

Next, in step S24, in a case where the display 51 has been operated by the user, the CPU 21 of the wireless operation unit 50 transmits operation information to the command communication unit 82 of the image forming apparatus 1 via the command communication unit 92. In the present example embodiment, a main menu screen which is being displayed on the display 51 is an image stored in the ROM 22 of the wireless operation unit 50. Accordingly, even if, as in the present example embodiment, the wireless operation unit 50 transmits coordinate data to the image forming apparatus 1, the CPU 11 of the image forming apparatus 1 is not aware of what button is present at the position indicated by the coordinate data. Therefore, in the present example embodiment, the CPU 21 of the wireless operation unit 50 transmits information corresponding to the button selected by the user (a second icon) as operation information to the image forming apparatus 1 via the command communication unit 92. Furthermore, the "button" as used herein includes various buttons such as "copy", "facsimile", "start", and "stop" buttons which are displayed on the display 51.

Next, in step S16, in response to the operation information about the display 51 input from the wireless operation unit 50, the CPU 11 of the image forming apparatus 1 issues, to the wireless operation unit 50, for example, an instruction for turning-on control of the illumination unit 54 and an instruction for turning-on and turning-off of sound to be output from the loudspeaker unit 53. Furthermore, even in cases other than the case where the image forming apparatus 1 has received operation information about the display 51 from the wireless operation unit 50, depending on the state of the image forming apparatus 1 or the state of the wireless operation unit 50, the CPU 11 of the image forming apparatus 1 issues the above-mentioned instructions to the wireless operation unit 50.

Here, in a case where the user has selected the maintenance button 64 in the main menu screen illustrated in FIG. 8A, then in steps S51 and S61, information corresponding to the maintenance button 64 is transmitted to the image forming apparatus 1 and a response thereto is transmitted from the image forming apparatus 1 to the wireless operation unit 50. Upon receiving the response from the image forming apparatus 1, the CPU 21 of the wireless operation unit 50 switches control in such a way as to display an image received by the image reception unit 93 (a first screen) as an image to be displayed on the display 51.

Figure 12:
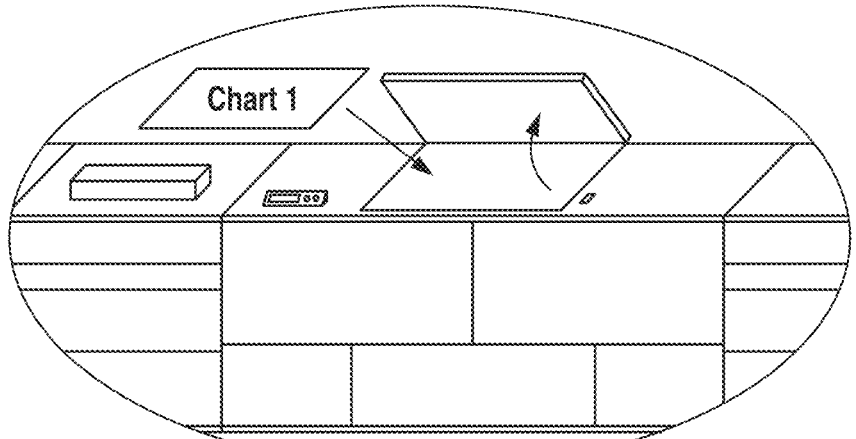
FIG. 12 is a diagram illustrating an example of an image which is displayed on the display of the wireless operation unit according to one embodiment.

Next, in step S52, the CPU 11 of the image forming apparatus 1 transmits a moving image for maintenance stored in the ROM 12 to the image reception unit 93 of the wireless operation unit 50 via the image transmission unit 83. FIG. 12 illustrates an example of a moving image for maintenance, which is an image adjustment screen G2 (an example of a first screen) used for explaining an operation procedure of image adjustment. As illustrated in FIG. 12, in the image adjustment screen G2, a serial operation of opening up the cover of the reader 14 and then placing a chart sheet on the glass surface of the reader 14 is explained in animation. The user places a chart sheet on the glass surface of the reader 14 according to the image adjustment screen G2, thus being able to adjust, for example, the color tone of an image to be formed by the image forming unit 15. Furthermore, the CPU 21 can temporarily store data about a first screen received by the image reception unit 93 in the RAM 23 and then display the data about a first screen on the display 51. Thus, the CPU 21 can be configured to display the data about a first screen received by the image reception unit 93 on the display 51 without via the RAM 23 or can be configured to display the data about a first screen received by the image reception unit 93 on the display 51 via the RAM 23.

When the user has completed adjustment of the image, then in step S62, that effect is transmitted from the CPU 21 of the wireless operation unit 50 to the command communication unit 82 of the image forming apparatus 1 via the command communication unit 92. After that, in step S53, a notification of switching of images is transmitted from the CPU 11 of the image forming apparatus 1 to the command communication unit 92 of the wireless operation unit 50 via the command communication unit 82. Upon receiving the notification of switching of images, the CPU 21 of the wireless operation unit 50 switches control in such a way as to display an image stored in the ROM 22 as an image to be displayed on the display 51.

Moreover, in a case where a paper jam, which is a blockage of the sheet S, has occurred when the image forming apparatus 1 is performing image formation, then in step S54, a notification of switching of images is transmitted from the CPU 11 of the image forming apparatus 1 to the wireless operation unit 50 via the command communication unit 82. Upon receiving the notification of switching of images, the CPU 21 of the wireless operation unit 50 switches control in such a way as to display an image received by the image reception unit 93 as an image to be displayed on the display 51.

Figure 13:
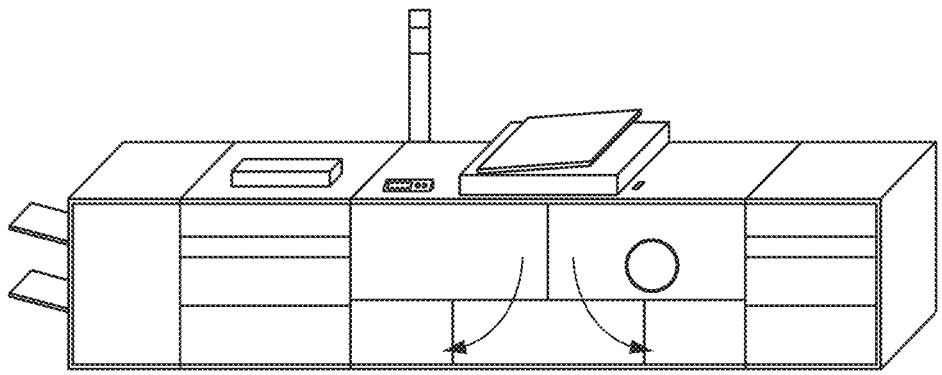
FIG. 13 is a diagram illustrating an example of an image which is displayed on the display of the wireless operation unit according to one embodiment.

Next, in step S55, the CPU 11 of the image forming apparatus 1 transmits a moving image related to jam processing stored in the ROM 12 to the image reception unit 93 of the wireless operation unit 50 via the image transmission unit 83. FIG. 13 is a diagram illustrating a jam processing screen G3 (an example of a first screen), which is an example of a moving image related to jam processing. As illustrated in FIG. 13, in the jam processing screen, a position where a paper jam has occurred and a jam processing procedure are explained in animation. The user performs jam processing according to the jam processing screen G3. Furthermore, the CPU 21 can temporarily store data about a first screen received by the image reception unit 93 in the RAM 23 and then display the data about a first screen on the display 51. Thus, the CPU 21 can be configured to display the data about a first screen received by the image reception unit 93 on the display 51 without via the RAM 23 or can be configured to display the data about a first screen received by the image reception unit 93 on the display 51 via the RAM 23.

When the user has completed jam processing, then in step S63, that effect is transmitted from the CPU 21 of the wireless operation unit 50 to the command communication unit 82 of the image forming apparatus 1 via the command communication unit 92. After that, in step S56, a notification of switching of images is transmitted from the CPU 11 of the image forming apparatus 1 to the command communication unit 92 of the wireless operation unit 50 via the command communication unit 82. Upon receiving the notification of switching of images, the CPU 21 of the wireless operation unit 50 switches control in such a way as to display an image stored in the ROM 22 as an image to be displayed on the display 51.

In this way, the CPU 21 is configured to be able to switch between an image stored in the ROM 22 of the wireless operation unit 50 (a second screen) and an image transmitted from the image forming apparatus 1 (a first screen), as an image to be displayed on the display 51 of the wireless operation unit 50. This enables reducing the amount of data to be stored in the ROM 22, as compared with a configuration in which all of the images to be displayed on the display 51 are stored in the ROM 22 of the wireless operation unit 50. Accordingly, it is possible to attain a reduction in the capacity of the ROM 22 and also attain a reduction in production cost. In other words, in a case where the wireless operation unit 50 is in a first mode, the display 51 displays a first screen and, in a case where the wireless operation unit 50 is in a second mode, the display 51 displays a second screen. Furthermore, in other embodiments, a configuration in which, when the display 51 of the wireless operation unit 50 displays a first screen, the CPU 21 temporarily stores data about the first screen in the RAM 23 and then reads out the data about the first screen from the RAM 23 can also be employed. As mentioned above, data about a second screen is previously stored in the ROM 22, but data about a first screen is not stored therein. However, when data about a first screen has been transmitted from the image transmission unit 83, the CPU 21 can temporarily store the received data in the RAM 23. Naturally, when the power switch 52 of the wireless operation unit 50 is in a turned-off state, the ROM 22 continues storing data about a second screen but does not continue storing data about a first screen. Moreover, when the wireless operation unit 50 is in the second mode, data about a first screen is currently not stored in the RAM 23.

Then, when any button displayed in the first screen (a first icon) has been touched, the wireless communication unit 91 transmits coordinate information corresponding to the position at which the first icon is displayed (data about the position) to the wireless communication unit 81. Furthermore, even when a region other than the regions at which various buttons are displayed, i.e., a region at which no button is displayed, has been touched, coordinate information about the touched region is transmitted to the wireless communication unit 81. This is for the purpose of reducing a production cost by simplifying design.

In this way, in a case where the first icon has been touched in the first screen, the wireless communication unit 91 transmits, to the wireless communication unit 81, not a command indicating that the first icon has been touched but only coordinate information. This enables reducing the amount of data for use in communication and thus improving communication stability.

Moreover, in a case where any button displayed in the second screen (a second icon or an execution icon) has been touched, the wireless communication unit 91 transmits a command corresponding to the second icon to the wireless communication unit 81. Such a button is a button corresponding to an execution key serving as a trigger for execution of the corresponding processing. For example, in a case where the second icon is an icon for "copy", the "command" is data (execution command) about an instruction for instructing the image forming apparatus 1 to perform a copying operation. In response to the wireless communication unit 81 receiving a command corresponding to the icon, the CPU 11 issues an instruction to a unit, such as the image forming unit 15, to perform a corresponding operation.

The same applies to other icons. For example, a description is provided with reference to a screen used for setting a printing condition such as that illustrated in FIG. 10A. Each of an icon used for setting "paper size", an icon used for setting "copy ratio", and an icon used for setting the "number of copies" displayed in the screen is an example of a second icon (setting icon). Such an icon corresponds to a setting key serving as a trigger for causing the image forming apparatus 1 to perform the corresponding setting.

When such an icon used for setting a printing condition is touched, a setting command for setting the printing condition is transmitted from the wireless communication unit 91 to the wireless communication unit 81. The "setting command" as used herein is data about an instruction for setting a printing condition, such as "paper size", "copy ratio", or "number of copies" when the image forming apparatus 1 is used to perform printing on a sheet. Thus, the setting command is not merely data about coordinates indicating the touched position on the display 51. The wireless operation unit 50 in the present example embodiment is a terminal specifically for the image forming apparatus 1 and is, therefore, usually configured to transmit not data about coordinates but a command.

Furthermore, as mentioned above, when displaying the first screen and the second screen on the display 51, the CPU 21 can read out data about the first screen and data about the second screen from the RAM 23. Specifically, the CPU 21 can temporarily store data about the first screen received by the image reception unit 93 in the RAM 23, read out the data about the first screen from the RAM 23, and display the first screen on the display 51. Moreover, the CPU 21 can temporarily store data about the second screen previously stored in the ROM 22 in the RAM 23, read out the data about the second screen from the RAM 23, and display the second screen on the display 51. In this case, while both the data about the first screen and the data about the second screen are made to be stored in the same RAM 23, the data about the first screen is not stored in the ROM 22. Therefore, it is possible to reduce the capacity of the ROM 22 as compared with a configuration in which both the data about the first screen and the data about the second screen are stored in the ROM 22. Moreover, as compared with a configuration in which both the data about the first screen and the data about the second screen are transmitted from the image transmission unit 83 to the image reception unit 93, it is possible to reduce the frequency of data communication to the extent that it is not necessary to communicate the data about the second screen, thus reducing the possibility of occurrence of a communication defect.

Furthermore, while a configuration in which a still image is stored in the ROM 22 of the wireless operation unit 50 and a moving image for jam processing and a moving image for image adjustment are transmitted from the image forming apparatus 1 to the wireless operation unit 50 has been described, the present invention is not limited to this configuration. Thus, for example, in the case of a configuration in which, for example, a process cartridge, a drum cartridge, or a toner cartridge, which is a replacement unit included in the image forming apparatus 1, is attachable to and detachable from (replaceable) the image forming apparatus 1, a configuration in which a moving image concerning attachment and detachment of such a cartridge is transmitted from the image forming apparatus 1 to the wireless operation unit 50 can be employed in other embodiments. Furthermore, since a moving image is an aggregate of a plurality of still images, such a moving image is constructed with an aggregate of a plurality of second screens.

Moreover, a configuration in which a moving image is stored in the ROM 22 of the wireless operation unit 50 can be employed. However, a moving image is configured with a plurality of still images and is larger in data amount than a still image. Accordingly, it is favorable to employ a configuration in which control is switched such that a still image is stored in the ROM 22 of the wireless operation unit 50 and, in displaying a moving image on the display 51, an image transmitted from the image forming apparatus 1 is displayed on the display 51.

<Case where a Plurality of Image Forming Apparatuses is Operated by Single Wireless Operation Unit>

A configuration in the present example embodiment is a configuration in which a single wireless operation unit 50 is able to switch between connection destinations to operate each of a plurality of image forming apparatuses 1. The other configurations are similar to those of the image forming apparatus 1 described in the above-described example embodiment.

Figure 14A:
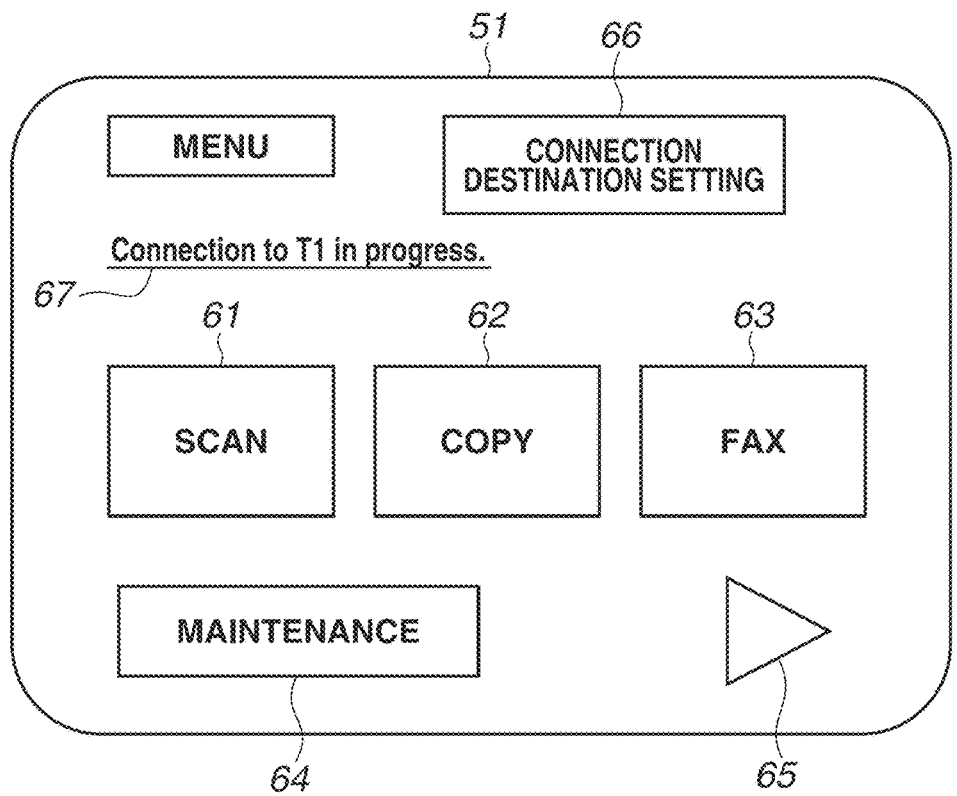
FIGS. 14A and 14B are diagrams illustrating examples of images each of which is displayed on the display of the wireless operation unit according to one embodiment.

FIG. 14A is a diagram illustrating a main menu screen which is displayed on the display 51 of the wireless operation unit 50. As illustrated in FIG. 14A, the main menu screen includes a connection destination setting button 66, which is used for setting an image forming apparatus 1 serving as a connection destination of the wireless operation unit 50, and a connection destination display portion 67, which displays an image forming apparatus 1 to which the wireless operation unit 50 is currently connecting. Here, an image forming apparatus 1 named "T1" is being connected as a connection destination of the wireless operation unit 50.

Figure 14B:
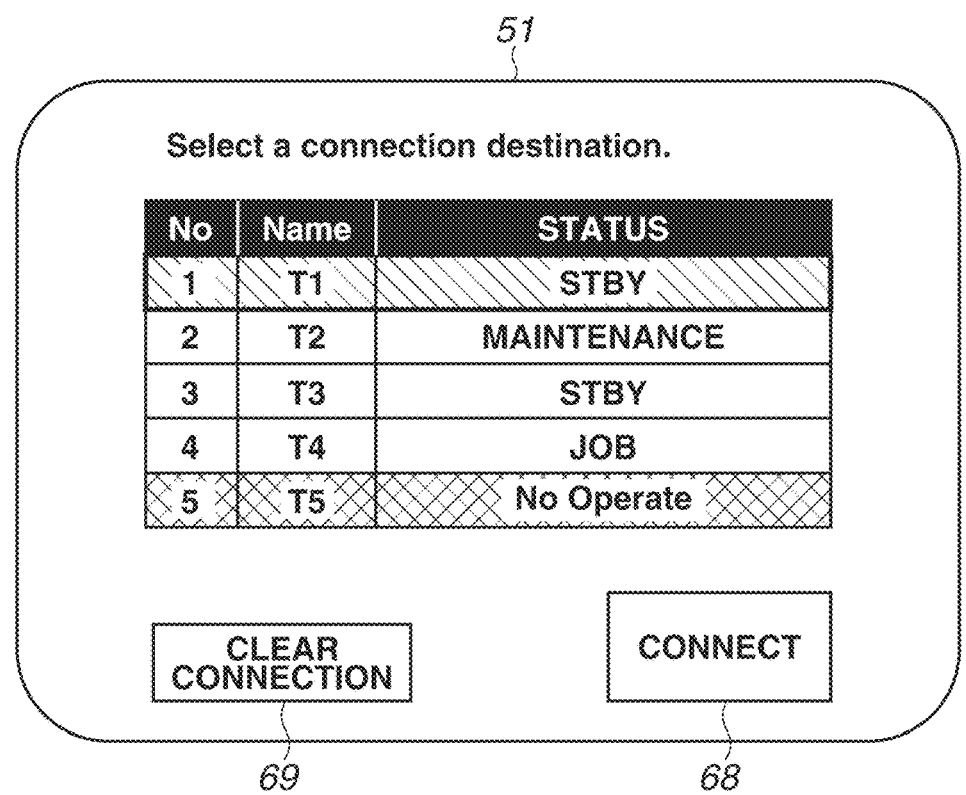

When wanting to change an image forming apparatus 1 serving as a connection destination of the wireless operation unit 50, the user selects the connection destination setting button 66 in the main menu screen to cause a connection destination setting screen illustrated in FIG. 14B to be displayed on the display 51. As illustrated in FIG. 14B, in the connection destination setting screen, a list of image forming apparatuses 1 which are subjected to recognition processing in advance with respect to the wireless operation unit 50 is displayed. In the present example embodiment, five image forming apparatuses 1 named "T1" to "T5" are currently recognized by the wireless operation unit 50. Moreover, in the connection destination setting screen, the current status of each of the image forming apparatuses 1 displayed in the list is displayed. For example, an image forming apparatus 1 to which the wireless operation unit 50 is currently connecting is displayed in hatching, and an image forming apparatus 1 which is in a powered-off state is displayed as "No Operate" and is grayed out.

Figure 15A:
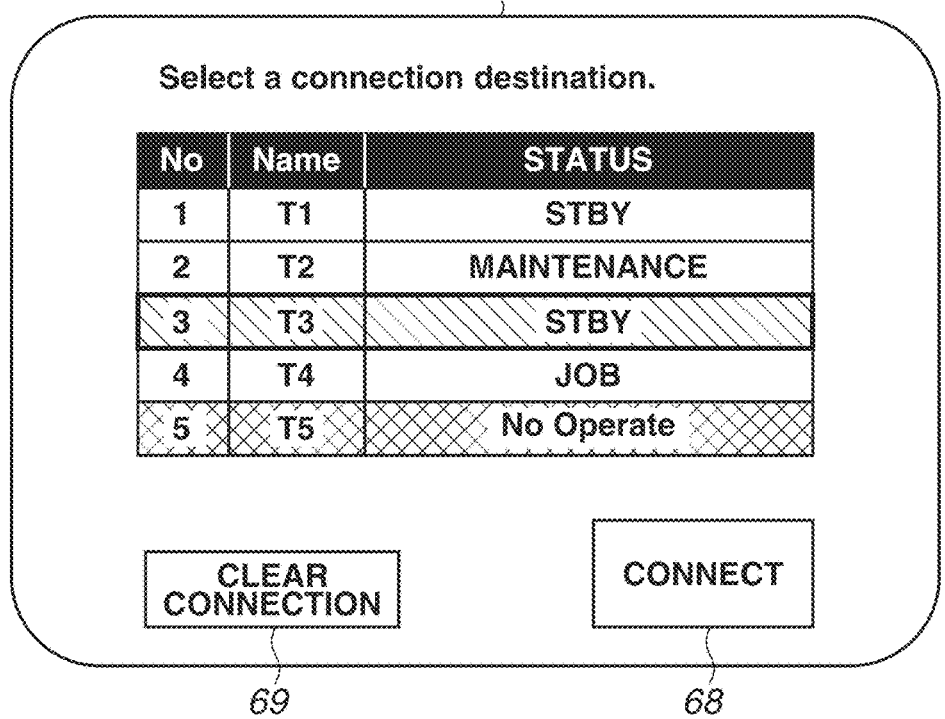
FIGS. 15A and 15B are diagrams illustrating examples of images each of which is displayed on the display of the wireless operation unit according to one embodiment.
Figure 15B:
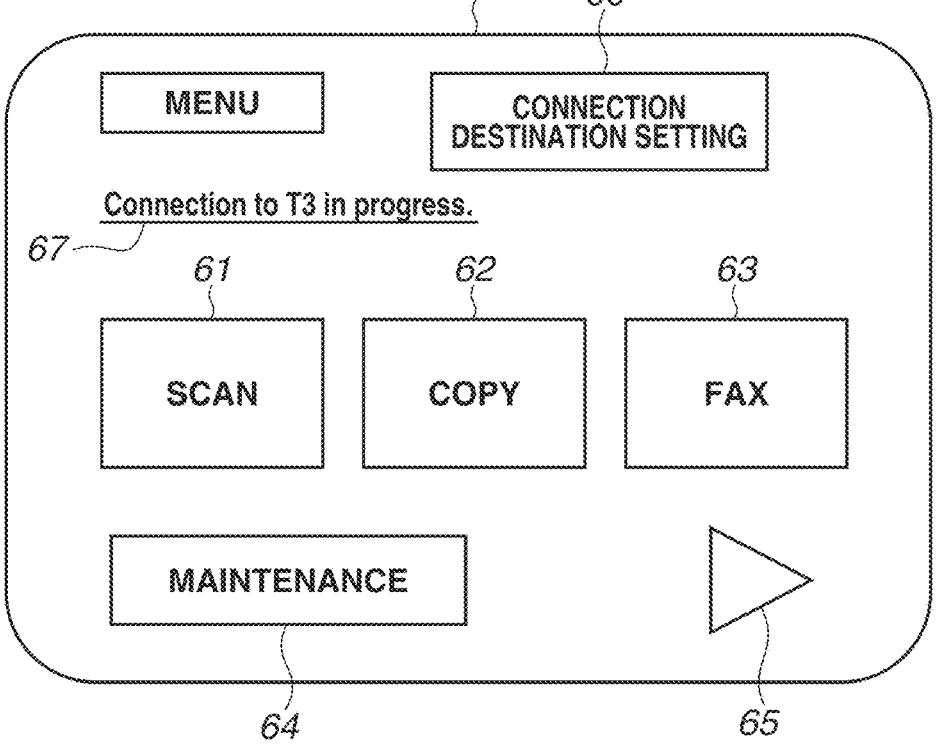

When wanting to change a connection destination of the wireless operation unit 50, the user touches and selects an image forming apparatus 1 desired for connection in the connection destination setting screen. Here, an image forming apparatus 1 named "T3" is assumed to be touched. With this touching, as illustrated in FIG. 15A, in the connection destination setting screen, the image forming apparatus 1 named "T3" is displayed in hatching, and displaying in hatching of the image forming apparatus 1 named "T1", to which the wireless operation unit 50 has previously connected, is canceled. When, in this state, the user selects a connection button 68, as illustrated in FIG. 15B, the wireless operation unit 50 connects to the image forming apparatus 1 named "T3".

Furthermore, in the case of canceling connection to all of the image forming apparatuses 1, the user selects a connection clearing button 69 in the connection destination setting screen illustrated in FIG. 15A. With this selection, connection of the wireless operation unit 50 to all of the image forming apparatuses 1 is canceled.

In this way, according to the configuration in the present example embodiment, the user is able to use a single wireless operation unit 50 to operate a plurality of image forming apparatuses 1. Accordingly, when operating a plurality of image forming apparatuses 1, the user does not need to replace wireless operation units 50, so that usability can be increased. Moreover, in a case where a wireless operation unit 50 is optionally purchased as an optional apparatus, the user only needs to purchase a single wireless operation unit 50 to enable operating a plurality of image forming apparatuses 1, so that it is possible to reduce cost for introducing a wireless operation unit 50.

<Transition-to-Sleep Mode Sequence>

Figure 16:
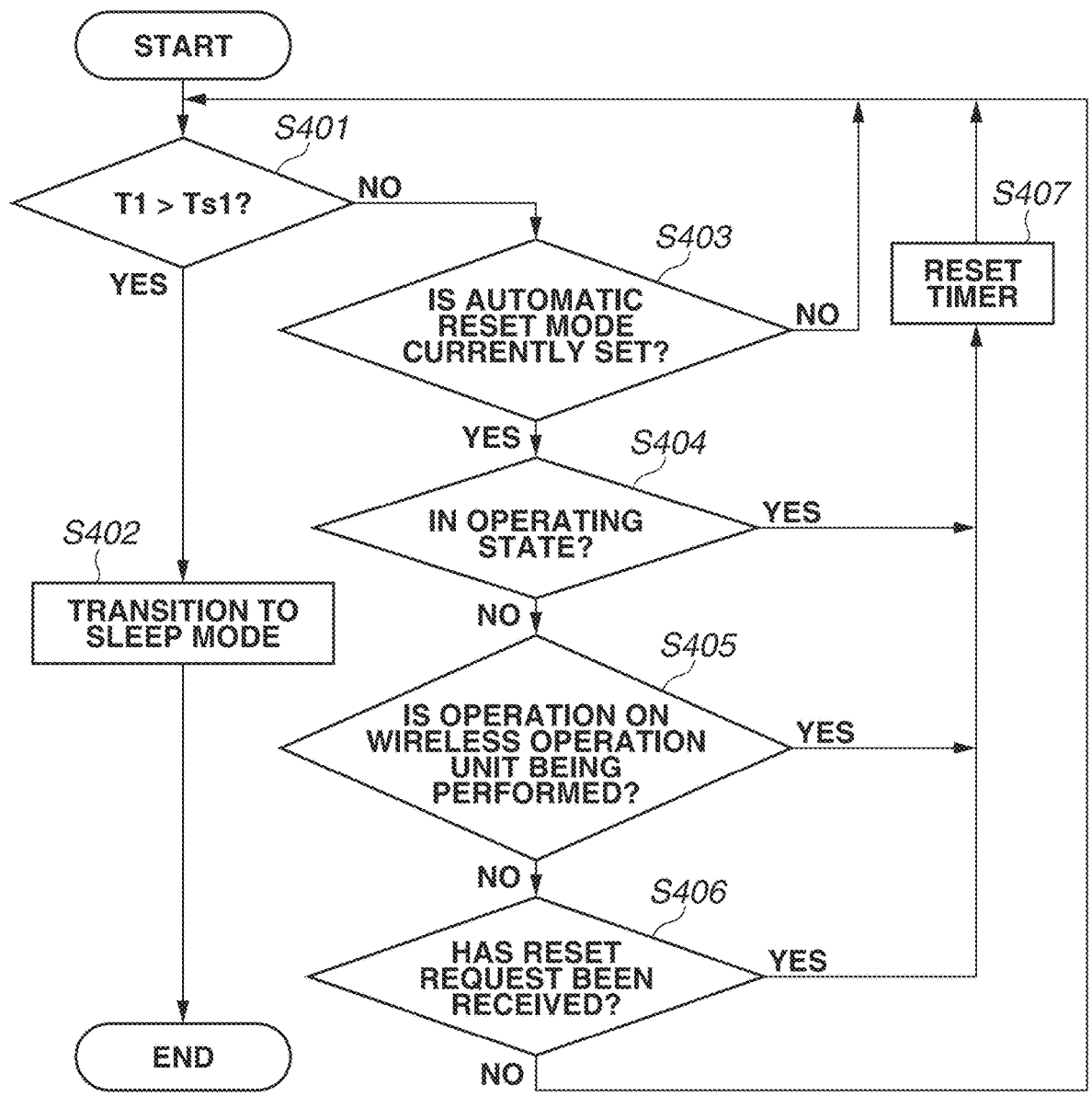
FIG. 16 is an example of a flowchart representing a transition sequence to a sleep mode according to one embodiment.

Next, respective control operations of the image forming apparatus 1 and the wireless operation unit 50 for transitioning to power-saving mode are described. FIG. 16 is a flowchart illustrating a transition-to-sleep mode sequence of the image forming apparatus 1, which is executed by the CPU 11.

As mentioned above, when a period in which an instruction for image formation is not issued to the image forming apparatus 1 begins, the timer 202 starts counting. The timer 202 is always performing counting, and the count value T1 obtained by the timer 202 is a count value used for managing transition to power-saving mode. The count value T1 is reset in step S407, for example, in a case where the image forming apparatus 1 has executed a job in step S404 or in a case where the wireless operation unit 50 has been operated by the user in step S405. Moreover, the count value T1 is also reset in step S407 in a case where a reset request command (a reset command) described below has been received from the wireless operation unit 50 in step S406.

Furthermore, the term "reset" in the present example embodiment refers to returning the count value of the timer 202 to a value obtained at a time point when the timer 202 started counting. For example, in a case where the timer 202 is incrementing counting in order from 0 seconds to 1 second, 2 seconds, 3 seconds, ..., when the timer 202 is reset, the count value of the timer 202 is re-set to 0 seconds. Additionally, for example, in a case where the timer 202 is decrementing counting in order from 60 seconds to 59 seconds, 58 seconds, 57 seconds, ..., when the timer 202 is reset, the count value of the timer 202 is re-set to 60 seconds.

Moreover, the term "reset" as used in the present example embodiment also includes setting for decreasing the count value of the timer 202 (in the case of incrementing the count value) and setting for increasing the count value of the timer 202 (in the case of decrementing the count value). Specifically, in a case where the timer 202 is incrementing counting in order from 0 seconds to 1 second, 2 seconds, 3 seconds, ..., when an operation on the wireless operation unit 50 has been performed at a time point when the count value is 45 seconds, the count value is decreased by 30 seconds. This causes a time required until the mode of the image forming apparatus 1 transitions to the sleep mode to increase substantially by 30 seconds. Moreover, in a case where the timer 202 is decrementing counting in order from 60 seconds to 59 seconds, 58 seconds, 57 seconds, ..., when an operation on the wireless operation unit 50 has been performed at a time point when the count value is 15 seconds, the count value is increased by 30 seconds. This causes a time required until the mode of the image forming apparatus 1 transitions to the sleep mode to increase substantially by 30 seconds. Furthermore, the amount by which to decrease (increase) the count value is not limited to a predetermined number of seconds and can be set by the user to an optional number of seconds.

In the following description, details of the transition-to-sleep mode sequence are described with reference to the flowchart of FIG. 16.

In step S401, the CPU 11 refers to the count value T1 of the timer 202 and compares the count value T1 with a previously set transition-to-power saving mode time Ts1. A predetermined time is previously set to the transition-to-power saving mode time Ts1. For example, the predetermined time is previously set such that "transition-to-power saving mode time Ts1=60 seconds". If the count value T1 of the timer 202 exceeds the transition-to-power saving mode time Ts1 (YES in step S401), then in step S402, the CPU 11 causes the mode of the image forming apparatus 1 to transition from the standby mode to the sleep mode. Thus, the CPU 11 causes the mode of the image forming apparatus 1 to transition from the standby mode to the sleep mode in response to the count value T1 exceeding the transition-to-power saving mode time Ts1.

While the above-mentioned example is an example in which the timer 202 is incrementing counting to measure a time for which an instruction for image formation is not issued by the user to the image forming apparatus 1, the method of measuring such a time can be a method of decrementing counting. Thus, the timer 202 can be decrementing counting to measure a time for which an instruction for image formation is not issued by the user to the image forming apparatus 1. For example, a case where, when the timer 202 decrements counting in order from 60 seconds to 59 seconds, 58 seconds, ..., in response to the count value exceeding 0 seconds, the CPU 11 causes the mode of the image forming apparatus 1 to transition from the standby mode to the sleep mode is assumed to be also a case where "the count value T1 has exceeded the transition-to-power saving mode time Ts1". The determination flow of "T1>Ts1?" in step S401 means a flow for comparing "a time for which an instruction for image formation is not issued by the user to the image forming apparatus 1" with a "predetermined time Ts1" to determine timing at which the image forming apparatus 1 enters into the sleep mode, and a counting method for such a determination is not limited.

If, in step S401, the count value T1 has not exceeded the transition-to-power saving mode time Ts1 (NO in step S401), then in step S403, the CPU 11 determines whether an "automatic reset mode" is currently set. Although details thereof are described below, the image forming apparatus 1 in the present example embodiment is able to set whether to turn on or off the function of resetting the count value of the timer 202 in response to an operation on the wireless operation unit 50 being performed by the user. Thus, when the automatic reset mode is in an off-state, even if the user operates the wireless operation unit 50, the count value of the timer 202 is never reset. Some users may give importance to a perspective of energy saving even if a frequent transition to the sleep mode causes a decrease in productivity. Some users may think that, even if an operation on the wireless operation unit 50 is being performed, as long as when an instruction for image formation will be issued is uncertain, it is favorable to cause the image forming apparatus 1 to enter into the sleep mode once to reduce power consumption. Accordingly, a configuration capable of performing setting as to whether to reset the count value of the timer 202 in response to the wireless operation unit 50 being operated according to the user's preference is favorable. Moreover, if the automatic reset mode is kept in an off-state, it is possible to prevent the count value of the timer 202 from being reset despite the intention of the user due to the user touching the wireless operation unit 50 by mistake.

If, in step S403, it is determined that the automatic reset mode is not currently set (NO in step S403), the CPU 11 returns the processing to the determination flow in step S401. During this period, the timer 202 is also continuing counting. On the other hand, if, in step S403, it is determined that the automatic reset mode is currently set (YES in step S403), then in step S404, the CPU 11 determines whether the image forming apparatus 1 is in an operating state. An example of the operating state as mentioned here refers to a state in which image forming processing is being performed by the image forming unit 15. A state in which the photosensitive drums 9 are rotating or a state in which the intermediate transfer belt 6 is rotating is also a type of the "operating state". Additionally, a state in which the reader 14 is performing reading of a sheet or a state in which a sheet is being conveyed is also a type of the "operating state" as mentioned here.

Furthermore, these operations are started based on an "instruction for image formation" issued by the user to the image forming apparatus 1. In the present example embodiment, the image forming apparatus 1 when being in an operating state is considered to be in a state in which an "instruction for image formation" has been issued. Thus, while the timer 202 measures a time for which an instruction for image formation is not issued from the user to the image forming apparatus 1, the timing of starting measurement in this case is timing at which the operating state of the image forming apparatus 1 has ended. However, this timing does not mean a mathematically rigorous moment. For example, the timer 202 can start counting a few seconds after the operating state of the image forming apparatus 1 has ended.

If it is determined that the image forming apparatus 1 is in an operating state (YES in step S404), then in step S407, the CPU 11 resets the count value of the timer 202. On the other hand, if it is determined that the image forming apparatus 1 is not in an operating state (NO in step S404), then in step S405, the CPU 11 determines whether an operation on the wireless operation unit 50 is being performed.

For example, when a setting operation for a printing condition is performed on the wireless operation unit 50, the command communication unit 92 transmits a signal indicating that an operation on the wireless operation unit 50 is being performed (hereinafter referred to as a "reset signal") to the command communication unit 82 via wireless communication. The reset signal is an example of a reset command. Specifically, each time the user touches an icon for setting the "number of copies", the command communication unit 92 transmits the reset signal to the command communication unit 82 of the image forming apparatus 1 (YES in step S405). Furthermore, the timing of transmitting the reset signal can be each time the user touches the touch panel 59, but can be "at intervals of a few seconds" or "at intervals of a few operations". For example, each time the timer 24 of the wireless operation unit 50 measures a period of five minutes, the CPU 21 can determine where a touch to the touch panel 59 has been performed during that time and, if the result of determination is yes, the CPU 21 can cause the command communication unit 92 to transmit the reset signal. This enables preventing the reset signal from being frequently generated, so that it is possible to reduce power consumption of the wireless operation unit 50 and thus increase the life of the battery 57. Additionally, a configuration in which, each time the touch panel 59 is touched, for example, three times, the CPU 21 transmits the reset signal to the command communication unit 92 can be employed. Even this configuration enables preventing the reset signal from being frequently generated, so that it is possible to reduce power consumption of the wireless operation unit 50 and thus increase the life of the battery 57.

In step S407, in response to the command communication unit 82 receiving the reset signal, the CPU 11 of the image forming apparatus 1 resets the count value of the timer 202. Furthermore, the present invention is not limited to this configuration, and, for example, in a case where an icon for the "number of copies" has been touched, in response to the command communication unit 82 receiving a setting command therefor, the CPU 11 can reset the count value of the timer 202. Thus, the wireless operation unit 50 can generate the reset signal, or the image forming apparatus 1 can generate the reset signal in response to the command communication unit 82 receiving the setting command used as a trigger. In any configuration, in the wireless operation unit 50, in any of the case where the execution icon has been touched and the case where the setting icon has been touched, the count value of the timer 202 is reset.

If it is determined that the wireless operation unit 50 is not being operated (NO in step S405), then in step S406, the CPU 11 determines whether the command communication unit 82 has received a reset request.

As illustrated in FIGS. 8A and 8B, a button used for issuing an instruction for "return to sleep" is displayed in the main menu screen, which is displayed on the display 51 of the wireless operation unit 50. The user is allowed to touch this button to reset the count value of the timer 202 of the image forming apparatus 1. Specifically, in response to a touch to the return-to-sleep button being detected, the CPU 21 issues an instruction to the command communication unit 92 to transmit the reset signal to the command communication unit 82 of the image forming apparatus 1.

If it is determined that the command communication unit 82 has received the reset request, i.e., the command communication unit 82 has received the reset signal (YES in step S406), then in step S407, the CPU 11 of the image forming apparatus 1 resets the count value of the timer 202.

If it is determined that the command communication unit 82 has not received the reset request (NO in step S406), the CPU 11 returns the processing to the determination flow in step S401. During that time, the timer 202 is continuing counting.

With the above-described flow performed, the image forming apparatus 1 transitions from the standby mode to the sleep mode, so that the transition-to-sleep mode sequence ends.

Figure 17:
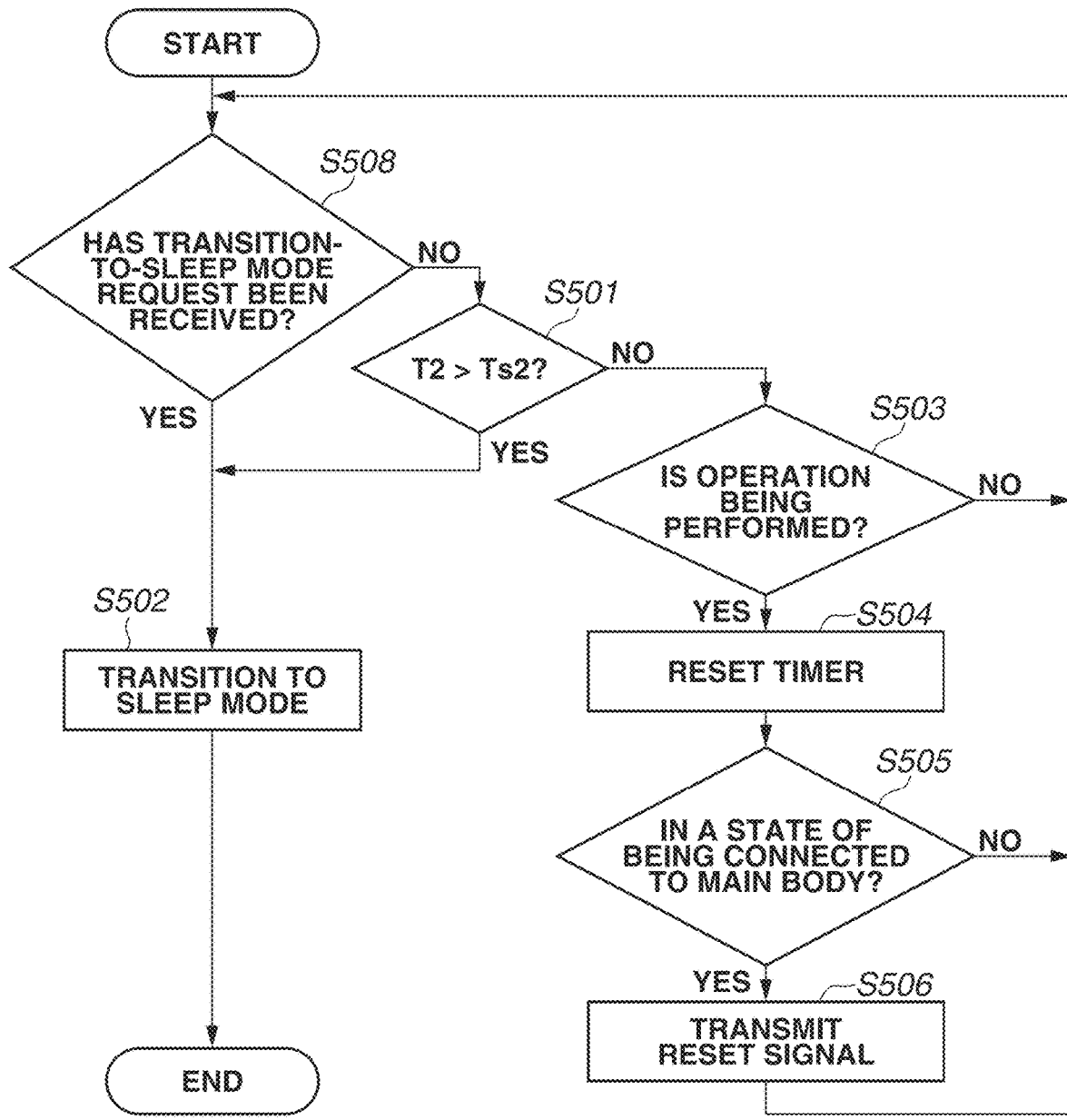
FIG. 17 is an example of a flowchart representing a transition sequence to a sleep mode according to one embodiment.

FIG. 17 is a flowchart illustrating a transition-to-sleep mode sequence of the wireless operation unit 50, which is executed by the CPU 21.

When the image forming apparatus 1 enters into a non-operating state, upon receiving an instruction from the CPU 21, the timer 24 starts counting. In step S508, the CPU 21 determines whether a transition-to-sleep mode request has been regularly received from the image forming apparatus 1. The transition-to-sleep mode request is a signal which is output by, for example, a transition-to-sleep mode button (not illustrated) provided on the main body of the image forming apparatus 1 being touched by the user. Thus, the wireless operation unit 50 is able to enter into the sleep mode based on a transition-to-sleep mode signal output from the image forming apparatus 1. If it is determined that the transition-to-sleep mode request has not been received from the image forming apparatus 1 (NO in step S508), the CPU 21 advances the processing to step S501.

In step S501, the CPU 21 refers to the count value T2 of the timer 24 and compares the count value T2 with a previously set transition-to-sleep mode time Ts2. If the count value T2 of the timer 24 exceeds the transition-to-sleep mode time Ts2 (YES in step S501), then in step S502, the CPU 21 performs processing for causing the wireless operation unit 50 to transition to the sleep mode. If it is determined that the transition-to-sleep mode request has been received from the image forming apparatus 1 (YES in step S508), then in step S502, the CPU 21 also performs the transition-to-sleep mode processing.

If, at timing of comparing the count value T2 of the timer 24 and the transition-to-sleep mode time Ts2, the count value T2 is smaller than or equal to the transition-to-sleep mode time Ts2 (NO in step S501), then in step S503, the CPU 21 determines the presence or absence of detection of a touch operation to the touch panel 59. If an operation by the user has not been detected (NO in step S503), the CPU 21 returns the processing to the comparison between the count value T2 and the transition-to-sleep mode time Ts2 in step S508. If an operation by the user has been detected (YES in step S503), then in step S504, the CPU 21 resets the count value T2 of the timer 24.

Next, in step S505, the CPU 21 determines whether the wireless operation unit 50 is in a state of being connected to the image forming apparatus 1 via wireless communication. If it is determined that the wireless operation unit 50 is in a state of being connected to the image forming apparatus 1 (YES in step S505), then in step S506, the CPU 21 transmits, to the image forming apparatus 1, a request for resetting the count value T1 of the timer 202 of the image forming apparatus 1, and then returns the processing to the comparison between the count value T2 and the transition-to-sleep mode time Ts2 in step S508. If it is determined that the wireless operation unit 50 is not in a state of being connected to the image forming apparatus 1 (NO in step S505), the CPU 21 returns the processing to the determination for checking the reception of the transition-to-sleep mode request in step S508.

Figure 18A:
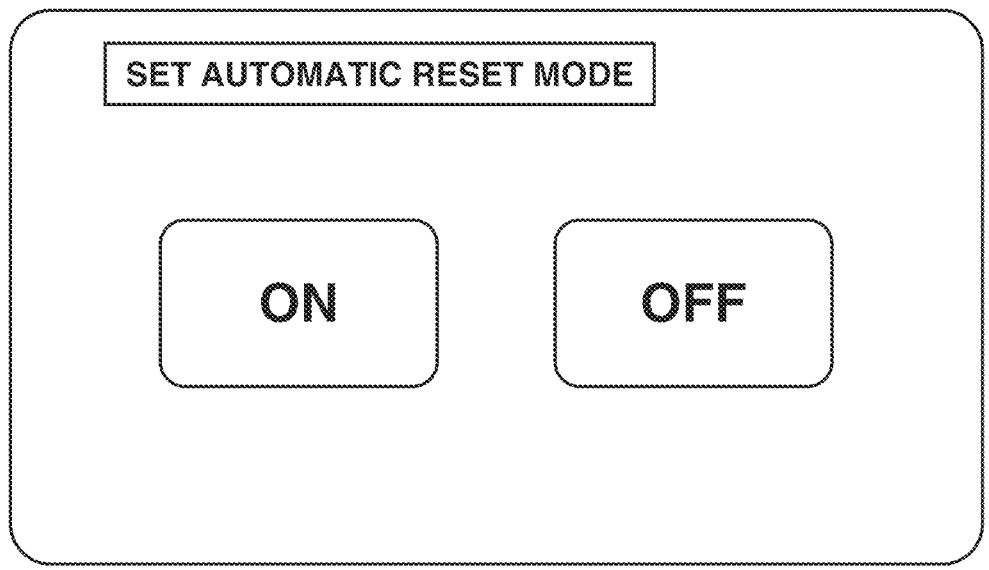
FIGS. 18A and 18B are diagrams illustrating screens related to an automatic reset mode according to one embodiment.

FIG. 18A illustrates a screen used for setting the "automatic reset mode" in the wireless operation unit 50. The user performs a predetermined operation via the main menu screen, thus causing the screen illustrated in FIG. 18A to be displayed. This screen allows turning-on and turning-off of the function for the automatic reset mode to be set by the user.

When the "automatic reset mode" has been turned on, as mentioned above, a reset signal is transmitted from the wireless operation unit 50 to the image forming apparatus 1 based on the wireless operation unit 50 being operated by the user, so that the count value of the timer 202 is reset.

On the other hand, when the "automatic reset mode" has been turned off, even if the user has operated the wireless operation unit 50, the reset signal is never transmitted from the wireless operation unit 50 to the image forming apparatus 1.

In this way, in the setting screen for the "automatic reset mode", the user is able to optionally determine whether to use the function of the "automatic reset mode".

Figure 18B:
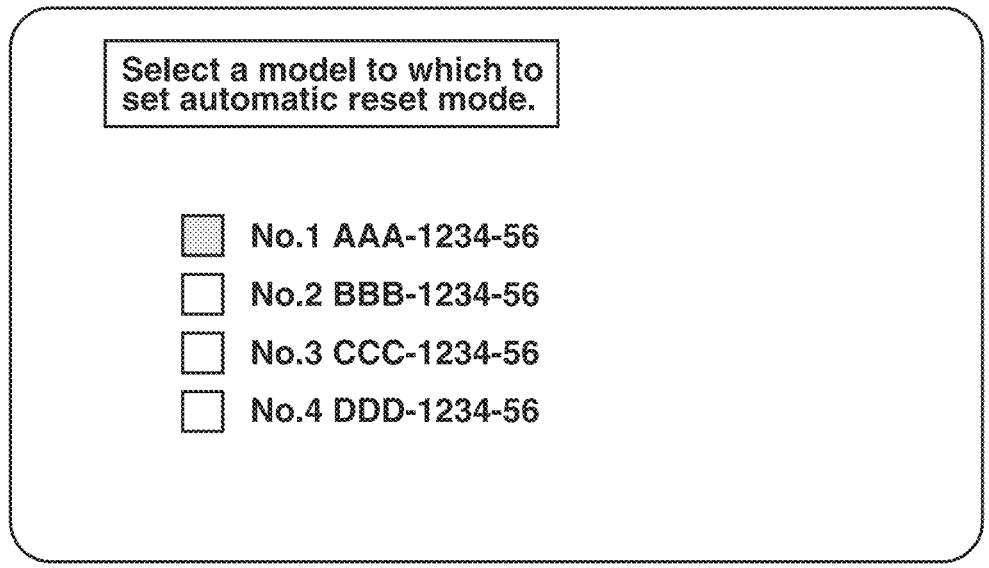

FIG. 18B illustrates a screen used for selecting an image forming apparatus 1 to which to set the automatic reset mode in the wireless operation unit 50.

As mentioned above, a single wireless operation unit 50 can be used to perform an operation on a plurality of different image forming apparatuses. If a single wireless operation unit 50 is compatible with four image forming apparatuses, in response to the single wireless operation unit 50 being operated, the count values of timers of all of the four image forming apparatuses may be reset. Since a single operation is able to be used to simultaneously reset the timers of a plurality of image forming apparatuses, there is an advantage in that, in the case of not wanting to bring about the sleep mode, the user is able to save trouble. However, for example, in a case where one image forming apparatus is handled by one operator, this advantage may cause an adverse issue.

Here, suppose a situation in which an operation on an image forming apparatus A is handled by an operator A and an operation on another image forming apparatus B is handled by an operator B. Each of the operator A and the operator B is using a shared wireless operation unit 50. In a case where the work of the operator A using the image forming apparatus A has reached a stage where the operator A can take a rest, since the image forming apparatus A will not be used for a while, from the viewpoint of energy saving, it is favorable that the image forming apparatus A enters into the sleep mode. However, even in such a situation, as long as the operator B is operating the wireless operation unit 50 to use the image forming apparatus B, not only the count value of the timer of the image forming apparatus B but also the count value of the timer of the image forming apparatus A continues to be reset. Thus, a situation may occur in which, despite not being substantially used, the image forming apparatus A does not transition to the sleep mode.

Therefore, in the wireless operation unit 50 in the present example embodiment, the user is allowed to select a model to which to set the automatic reset mode, out of the plurality of image forming apparatuses. In an automatic reset mode selection screen illustrated in FIG. 18B, the user touches a display item corresponding to the model to which to set the automatic reset mode. In this example, the automatic reset mode is currently set to only an image forming apparatus "AAA-1234-56". Therefore, for example, even in a case where the user has operated the wireless operation unit 50, the reset signal is transmitted to only the image forming apparatus "AAA-1234-56". Furthermore, the automatic reset mode can be set to a plurality of image forming apparatuses.

Figure 19A:
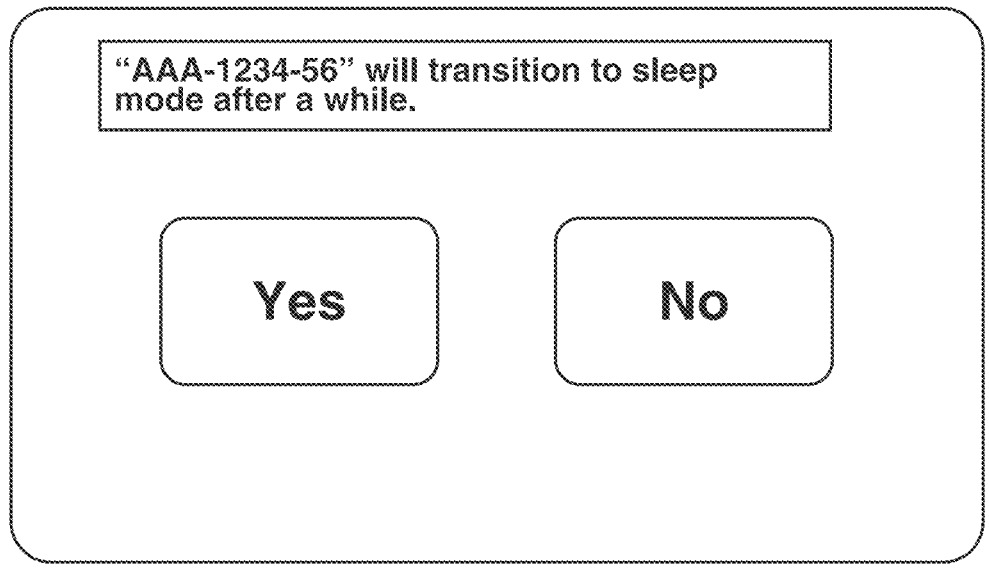
FIGS. 19A and 19B are diagrams illustrating screens related to an alert mode according to one embodiment.

FIG. 19A illustrates a screen in which a message indicating that the image forming apparatus 1 will transition to the sleep mode after the elapse of a given time is displayed on the display 51 of the wireless operation unit 50. Although details are described below, when a time for which an instruction for image formation to the image forming apparatus 1 has not been issued reaches a predetermined time, this alert screen is displayed. With this alert screen, the user can become aware that the image forming apparatus 1 will transition to the sleep mode after a while, thus being able to give a reaction, such as coming to the image forming apparatus 1 and pressing a button for resetting the count value of the timer 202.

Moreover, resetting of the timer 202 can also be performed via the wireless operation unit 50. In the alert screen, the user is allowed to select whether to transmit a reset signal to the image forming apparatus 1. In the screen illustrated in FIG. 19A, when the user selects "Yes", the command communication unit 92 transmits a reset signal to the command communication unit 82 of the image forming apparatus 1. On the other hand, when the user selects "No", no reset signal is transmitted from the command communication unit 92 to the command communication unit 82. Thus, the timer 202 continues counting.

Figure 19B:
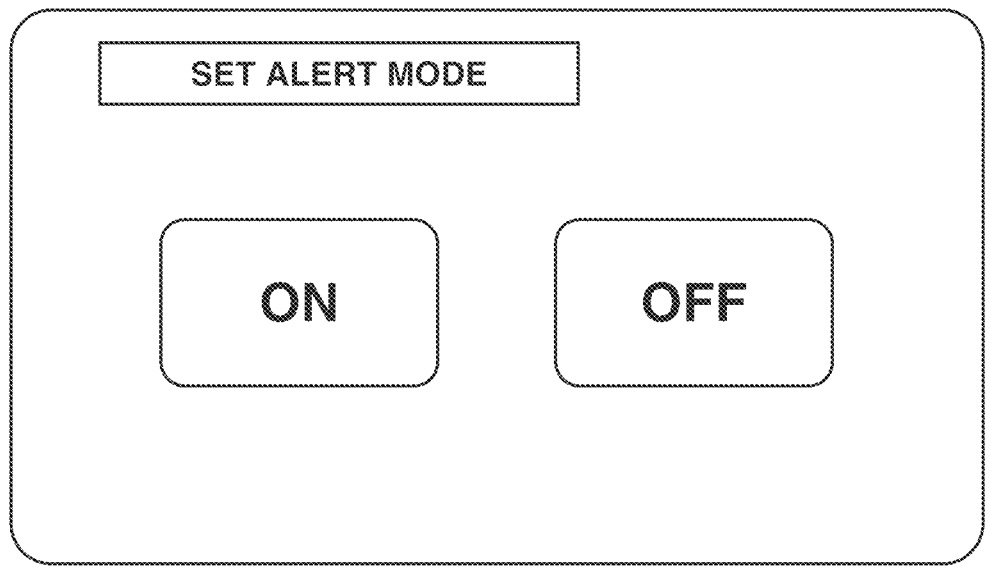

Furthermore, the user is also allowed to set whether to set an alert mode, which is a mode for displaying an alert screen, using a screen such as that illustrated in FIG. 19B.

Figure 20:
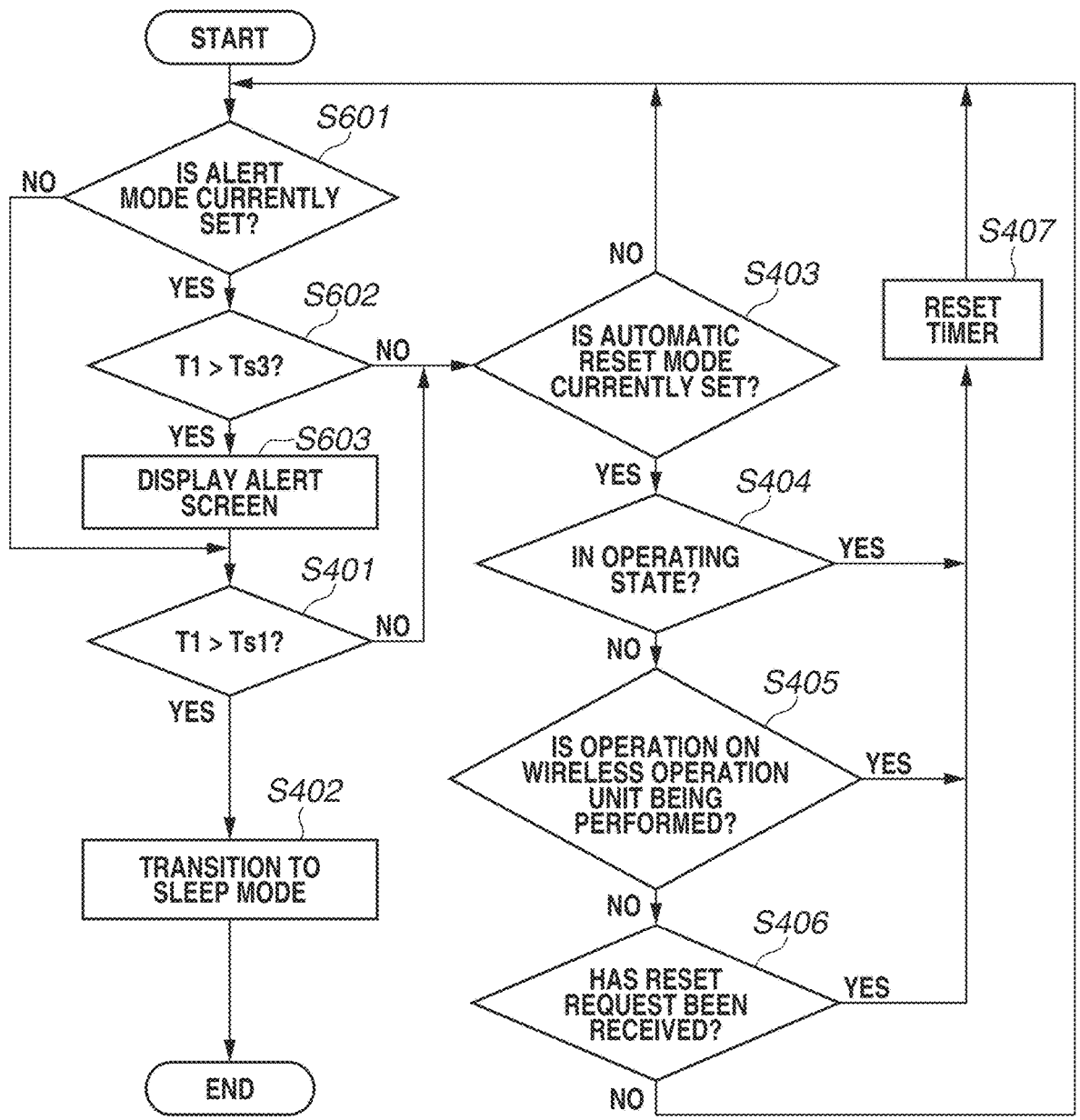
FIG. 20 is an example of a flowchart representing a transition sequence to a sleep mode according to one embodiment.

FIG. 20 is a flowchart illustrating a transition-to-sleep mode sequence which an image forming apparatus 1 having the alert mode performs. In the flowchart of FIG. 20, the same steps as those in the flowchart of FIG. 16 are assigned the respective same step numbers as those in the flowchart of FIG. 16, and the description thereof is omitted.

First, in step S601, the CPU 11 determines whether the alert mode is currently set. If it is determined that the alert mode is not currently set (NO in step S601), the CPU 11 advances the processing to step S401. On the other hand, if it is determined that the alert mode is currently set (YES in step S601), then in step S602, the CPU 11 refers to the count value T1 of the timer 202 and compares the count value T1 with a previously set alert display time Ts3. A time shorter than the transition-to-power saving mode time Ts1 is set to the alert display time Ts3. Thus, when performing counting, the timer 202 first reaches the alert display time Ts3 and then reaches the transition-to-power saving mode time Ts1.

If it is determined that the count value T1 exceeds the alert display time Ts3 (YES in step S602), the CPU 11 issues an instruction to the command communication unit 82 to transmit an alert signal to the command communication unit 92 of the wireless operation unit 50. In response to receiving the alert signal, the CPU 21 displays an alert screen on the display 51 in step S603. On the other hand, if it is determined that the count value T1 does not exceed the alert display time Ts3 (NO in step S602), the CPU 11 advances the processing to step S403.

As described above, according to the configuration of the present example embodiment, it is possible to reduce the possibility that an image forming apparatus transitions from the standby mode to the sleep mode despite the intention of a user who is operating a wireless operation unit.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-166313 filed Sep. 30, 2020, which is hereby incorporated by reference herein in its entirety.

What is claimed is:

1. An image forming system comprising:
an image forming apparatus including an image forming unit for forming an image on a sheet and configured to receive an execution command for causing the image forming unit to perform image formation, and configured to be able to transition between a standby mode, which is an electric power state that enables performing image formation in response to the execution command being received, and a sleep mode, in which reception of the execution command is not performed and which is an electric power state in which less power is consumed than in the standby mode;
a wireless operation device including a setting icon corresponding to a setting key for setting an image forming condition for image formation to be performed and an execution icon corresponding to an execution key for causing image formation that is based on an image forming condition to be set by the setting key, to be performed, and configured to wirelessly transmit an operation command to the image forming apparatus in response to the setting icon being operated and to wirelessly transmit an execution command to the image forming apparatus in response to the execution icon being operated;
a counter configured to count a time for determining timing at which the image forming apparatus transitions from the standby mode to the sleep mode; and
a resetter configured to reset a count value provided by the counter regardless of whether any one of the execution icon or the setting icon is operated.

2. The image forming system according to claim 1, wherein the wireless operation device includes a touch panel display capable of displaying the setting icon and the execution icon and configured to receive a touch operation performed by a user.

3. The image forming system according to claim 1, wherein the image forming apparatus includes a controller configured to control the image forming unit, and the controller has a function of the resetter.

4. The image forming system according to claim 1, wherein the image forming apparatus includes the resetter, and is capable of being set to (1) a first mode for causing the resetter to reset the count value and (2) a second mode for causing the resetter not to reset the count value.

5. The image forming system according to claim 1, wherein the wireless operation device includes the resetter, and the wireless operation device wirelessly transmits, to the image forming apparatus, a reset command for resetting the count value in response to any one of the execution icon and the setting icon being selected.

6. The image forming system according to claim 1, wherein the image forming apparatus transitions to the sleep mode in response to the counter counting a predetermined time in a state of the standby mode, and the counter counts the predetermined time by incrementing the count value.

7. The image forming system according to claim 1, wherein the image forming apparatus transitions to the sleep mode in response to the counter counting a predetermined time in a state of the standby mode, and the counter counts the predetermined time by decrementing the count value.

8. A wireless operation unit for operating, via wireless communication, an image forming apparatus, the image forming apparatus including an image forming unit for forming an image on a sheet and configured to receive an execution command for causing the image forming unit to perform image formation, and configured to be able to transition between a standby mode, which is an electric power state that enables performing image formation in response to the execution command being received, and a sleep mode, in which reception of the execution command is not performed and which is an electric power state in which less power is consumed than in the standby mode, the wireless operation unit comprising:
an operation unit including a setting icon corresponding to a setting key for setting an image forming condition for image formation to be performed and an execution icon corresponding to an execution key for causing image formation that is based on an image forming condition to be set by using the setting key, to be performed, wherein an operation command is wirelessly transmitted to the image forming apparatus in response to the setting icon being operated, and an execution command is wirelessly transmitted to the image forming apparatus in response to the execution icon being operated;
a counter configured to be able to reset a count value for a time for determining timing at which the image forming apparatus transitions from the standby mode to the sleep mode; and
a resetter configured to reset the count value of the counter regardless of whether any one of the execution icon or the setting icon is operated.

9. The wireless operation unit according to claim 8, further comprising a touch panel display capable of displaying the setting icon and the execution icon and configured to receive a touch operation performed by a user.

10. The wireless operation unit according to claim 8, wherein the wireless operation unit is capable of being set to (1) a first mode for causing the resetter to transmit, to the image forming apparatus, a reset command for resetting the count value and (2) a second mode for causing the resetter not to transmit the reset command to the image forming apparatus.

* * * * *